(12) United States Patent
Luo et al.

(10) Patent No.: US 12,726,138 B2
(45) Date of Patent: Sep. 1, 2026

(54) X-TYPE MULTILEVEL CONVERTER SYSTEMS INCLUDING INTERLEAVED TOPOLOGIES FOR MUTUAL INDUCTANCE CANCELLATION

(71) Applicant: GM GLOBAL TECHNOLOGY OPERATIONS LLC, Detroit, MI (US)

(72) Inventors: Yilun Luo, Ann Arbor, MI (US); Khorshed Mohammed Alam, Canton, MI (US); Chandra S. Namuduri, Troy, MI (US); Benjamin S. Ngu, Rochester Hills, MI (US); Rashmi Prasad, Troy, MI (US); Michael Z. Pieszala, Panama City, FL (US)

(73) Assignee: GM Global Technology Operations LLC, Detroit, MI (US)

( * ) Notice: Subject to any disclaimer, the term of this patent is extended or adjusted under 35 U.S.C. 154(b) by 131 days.

(21) Appl. No.: 18/958,823

(22) Filed: Nov. 25, 2024

(65) Prior Publication Data

US 2026/0149391 A1 May 28, 2026

(51) Int. Cl.
*H02M 7/53862* (2007.01)
*H02M 7/00* (2006.01)
*H02M 7/53846* (2007.01)

(52) U.S. Cl.
CPC ....... *H02M 7/53862* (2013.01); *H02M 7/003* (2013.01); *H02M 7/538466* (2013.01)

(58) Field of Classification Search
CPC ........... H02M 7/53862; H02M 7/5387; H02M 7/53871; H02M 7/53873; H02M 7/53846; H02M 7/003; H02M 7/02; H02M 7/00; H02M 7/10; H02M 7/538466; H02M 7/525
See application file for complete search history.

(56) References Cited

U.S. PATENT DOCUMENTS 9,917,543 B1 * 3/2018 Sarlioglu ................ H02P 25/22
12,636,964 B2 * 5/2026 Farahmand ............. B60L 53/14
2015/0236634 A1 * 8/2015 Han .......................... H02P 5/74
318/504
2023/0238895 A1 7/2023 Moon et al.

FOREIGN PATENT DOCUMENTS

DE 102018200712 A1 8/2018

* cited by examiner

*Primary Examiner* — Nguyen Tran
(74) *Attorney, Agent, or Firm* — Quinn IP Law

(57) ABSTRACT

A multi-phase power inverter including a plurality of X-type multilevel power converters arranged to transfer electric power between a high-voltage direct current (DC) power supply and an electric machine. Each of the plurality of X-type multilevel power converters is configured as a solid-state integrated circuit (IC) including a plurality of semiconductor switches and clamping diodes. The plurality of semiconductor switches, a positive DC power bus, a negative DC power bus, a first AC bus, a second AC bus, a third AC bus, a fourth AC bus, and the clamping diodes are arranged into a plurality of tiers. Such that both the positive DC power bus and the negative DC power bus are parallel with the auxiliary or neutral bus generating mutual inductance cancellation that minimizes parasitic inductance by coupling positive mutual inductance and negative mutual inductance for commutation loop currents within each of the X-type multilevel converters.

20 Claims, 12 Drawing Sheets

150
110
111
112
S1, 151
S2, 152
S3, 153
S4, 154
$V_{O1}$
121
161
162
163
D1, 171
D2, 172
164
165
166
S5, 155
S6, 156
S7, 157
S8, 158
$V_{O2}$
122
102
103
105

250
250-1
5A
5B
280A
247A
249A
249B
248A
280B
242A
242B
280A-1
280B-1
S8, 258
S1, 251
246A
246B
S7, 257
S2, 252
246A
246B
D1, 271
280B-2
T2
T5
246A
246B
280A-2
D2, 272
T1
T6
T3
T4
5A
5B
250-2

250
102, 210
249A
250-1
S5, 255
S1, 251
247A
249A
248A
S6, 256
D1, 271
S2, 252
D1
D1
222A
180A
221A
P1
P2
P3
250-2

250
103, 212
249B
250-1
S8, 258
S4, 254
247B
249B
248B
S7, 257
D2, 272
S3, 253
D2
D2
222B
180B
221B
250-2
P1
P2
P3

450
450-1
7A
7B
102, 410
103, 412
480A
446A
446B
480B
449A
449B
480A-1
480B-1
S5, 455
S4, 454
447A
448B
D1, 471
446A
449A
449B
S6, 456
S3, 453
480A-2
480B-2
T1
T6
T2
T5
442A
442B
446A
446B
422A
T3
T4
421B
7A
7B
450-2

450
102, 410
449A
S8, 458
S4, 454
D1, 471
D2, 472
447A
448A
S7, 457
S3, 453
449A
422A
421A
480A
P1
P2
P3

450
103, 412
449B
S5, 455
S1, 451
D2, 472
D1, 471
447B
448B
S6, 456
S2, 452
449B
422B
421B
480B
P1
P2
P3

550
550-1
8A
8B
102, 510
103, 512
580A
580B
580A-1
580B-1
549A
549B
S5, 555
S1, 551
547A
548B
D1, 571
546A, 546B
S6, 556
S2, 552
580A-2
580B-2
T1
T4
542A
542B
522A
521B
T2
T3
550-2

549A
548A
D2, 572
S6, 556
521A
580A
P1
P2
P3

549B
S8, 458
S4, 554
547B
548B
S7, 457
S3, 553
522B
521B
580B 650
650-1
9A
9B
102, 610
103, 612
680A
680B
649A
649B
S5, 655
S4, 654
647A
648B
680A-1
680B-1
D1, 671
646A, 646B
D2, 672
S6, 656
S3, 653
680A-2
680B-2
T2
T3
642A
642B
622A
621B
T1
T4
650-2

S1, 651
647B
S2, 652
621A
P1
P2
P3

S8, 658
S7, 657
622B
680B 750
750-1
10A
10B
102, 710A
103, 712B
780A
780B
780A-1
780B-1
S5, 755
S4, 754
D1, 771
D2, 772
747A
748B
S6, 756
S3, 753
T1
T4
780A-2
780B-2
742A
742B
721
722
T2
T3
750-2

750
102, 710A
D1, 771
749A
103, 712A
S8, 758
748A
S7, 757
780A
P1
P2
P3

102, 710B
749B
103, 712B
S1, 751
747B
S2, 752
748B

X-TYPE MULTILEVEL CONVERTER SYSTEMS INCLUDING INTERLEAVED TOPOLOGIES FOR MUTUAL INDUCTANCE CANCELLATION

INTRODUCTION

The concepts described herein relate generally to vehicles employing electrified powertrain or propulsion systems, which are composed with direct current (DC) power supplies that provide DC electric power, which is converted to alternating current (AC) electric power via multi-phase power inverters, to control operation of one or multiple electric machines.

High-voltage and high-power multilevel inverters (MLIs) have gained attention as the transportation electrification trend of consumer and commercial vehicles is rapidly expanding towards high-capacity mass transit systems such as electric aircraft, trains, and ships. MLIs such as neutral point clamped (NPC) and X-type inverters provide high-voltage and high-power operation capabilities but include stacked DC-link capacitors with a neutral point connection for zero voltage vector. This neutral point connection to the stacked DC-link capacitor may generate a neutral current oscillating at three times the fundamental frequency, which may cause voltage imbalance on capacitors and switching devices.

A multi-phase power inverter circuit may generate an inherent power loop in which high current flows from a DC-link capacitor to a high-side (HS) of the multilevel power inverter, then to a low-side (LS) of the multilevel power inverter and back. The power loop may generate magnetic fields, and form parasitic loop inductance.

As multi-phase power inverters may include wide band gap (WBG) semiconductor materials that operate at higher switching frequencies, even small levels of parasitic loop inductance may lead to issues, for example, but not limited to switching losses, ringing, and/or electromagnetic interference (EMI).

The current flow path determines the size of the power loop, which determines the size of the magnetic field generated, and hence the size of the parasitic inductance. The current flow path is defined by the topology of the circuit, and therefore the topology of the circuit may affect the size of the parasitic loop inductance and stray inductance.

SUMMARY

In view of the above discussion, it is useful to develop a system of integrating power semiconductor devices including selective active and passive vertical and/or lateral semiconductor dies to effect mutual inductance cancellation for a multi-phase power inverter including a plurality of X-type multilevel power converters having an interleaved topology that reduces parasitic inductance within the multi-phase power inverter and/or within each X-type multilevel power converter.

The concepts disclosed herein relate to a system for a multi-phase power inverter including a plurality of X-type multilevel power converters having interleaved topologies that may achieve mutual inductance cancellation. The interleaved topologies pair semiconductor switches, and their respective buses on top or adjacent to one another coupling the positive bus (P bus) and the negative bus (N bus), and synchronizing the switching of the semiconductor switch pairs to cancel their electromagnetic fields to reduce their inductances including parasitic loop and stray inductances, bearing current, motor insulation voltage, and electromagnetic interference (EMI).

The interleaved topologies may reduce the gate loop, the power commutation loop, and the overall loop area of the X-type multilevel power converter, which may reduce the parasitic inductance.

Such a system may be used in vehicles having an electrified propulsion system, for example, but not limited to, a motor vehicle having an electrified powertrain or propulsion system, e.g., an electric vehicle (EV) or plug-in hybrid electric vehicle (PHEV), or another mobile platform, which may be powered by an electric propulsion system, to reduce parasitic inductance within the multi-phase power inverter.

Each multi-phase power inverter may include a plurality of X-type multilevel power converters arranged between a high-voltage direct current (DC) power source and an electric machine. The number of X-type multilevel power converters required is application specific.

Each X-type multilevel power converter may be configured as a solid-state integrated circuit (IC) that includes a plurality of circuit components, for example, but not limited to semiconductor switches and busbars, which are connected to form a network of interconnections through which current may flow. The form of this network of interconnected circuitry is called a circuit topology.

Interleaved circuit topologies may be used to connect multiple inverters and/or converters to achieve system-level goals, for example but not limited to reduced parasitic inductance within an X-type multilevel power converter and/or a multi-phase power inverter.

Ceramics, a printed control board (PCB), or cold plate may be included between folded legs of the X-type multilevel power converter to provide double-sided and/or single-sided cooling of the X-type multilevel power converter.

The concepts described herein provide a multi-phase power inverter that is advantageously arranged to minimize stray inductance and loop inductance employing magnetic field cancellation. This includes using cancelling fields by arranging positive, neutral and negative buses and a plurality of X-type multilevel power converters arranged in solid-state integrated circuits having laterally sectioned elements. The arrangement of the X-type multilevel power converters with laterally sectioned elements enables either single-sided or double-sided cooling to reduce thermal impedance. This configuration may serve to reduce stray inductance, thus leading to lower switching loss, less ringing, less electromagnetic interference (EMI), and lower device thermal stress.

A multi-phase power inverter may include a plurality of X-type multilevel power converters arranged to transfer electric power between a high-voltage direct current (DC) power source and an electric machine. Each of the plurality of X-type multilevel power converters may be configured as a solid-state integrated circuit (IC) that may include a positive DC power bus, a negative DC power bus, a neutral bus, a first alternating current (AC) bus, a second AC bus, a third AC bus, a fourth AC bus, a first conductive layer, a second conductive layer, a third conductive layer, a fourth conductive layer, a plurality of semiconductor switches, a first clamping diode, and a second clamping diode.

The multi-phase power inverter may further include a first heat sink, a second heat sink; a first power module substrate, and a second power module substrate.

A first conductive spacer may be arranged between the first clamping diode and the second power module substrate, and a second conductive spacer may be arranged between the second clamping diode and the first power module substrate.

The plurality of semiconductor switches may include a first semiconductor switch, a second semiconductor switch, a third semiconductor switch, a fourth semiconductor switch, a fifth semiconductor switch, a sixth semiconductor switch, a seventh semiconductor switch, and an eighth semiconductor switch.

The first semiconductor switch, the second semiconductor switch, the third semiconductor switch, and the fourth semiconductor switch may be connected in series between the positive DC power bus and the negative DC power bus.

The fifth semiconductor switch, the sixth semiconductor switch, the seventh semiconductor switch, and the eighth semiconductor switch may be connected in series between the positive DC power bus and the negative DC power bus.

The first semiconductor switch may be connected to the second semiconductor switch at a first node, the second semiconductor switch may be connected to the third semiconductor switch at a second node, and the third semiconductor switch may be connected to the fourth semiconductor switch at a third node.

The fifth semiconductor switch may be connected to the sixth semiconductor switch at a fourth node, the sixth semiconductor switch may be connected to the seventh semiconductor switch at a fifth node, and the seventh semiconductor switch may be connected to the eighth semiconductor switch at a sixth node.

The first clamping diode may be connected between the third node and the fourth node, and the second clamping diode may be connected between the first node and the sixth node.

The second node may be connected to the first AC bus.

The fifth node may be connected to the second AC bus.

The plurality of semiconductor switches, the positive DC power bus, the negative DC power bus, the first AC bus, the second AC bus, the third AC bus, the fourth AC bus, the first clamping diode, and the second clamping diode may be arranged into a plurality of tiers.

The plurality of tiers may include a first tier, a second tier, a third tier, and a fourth tier.

The first tier may be composed of the first semiconductor switch arranged coplanar with the second semiconductor switch that is arranged coplanar with first clamping diode that is arranged coplanar with the fifth semiconductor switch that is arranged coplanar with the sixth semiconductor switch.

The second tier may be composed of the positive DC power bus arranged coplanar with the first conductive layer that is arranged coplanar with the second conductive layer that is arranged coplanar with the first AC bus that is arranged coplanar with the second AC bus.

The third tier may be composed of the negative DC power bus arranged coplanar with the third conductive layer that is arranged coplanar with the fourth conductive layer that is arranged coplanar with the third AC bus that is arranged coplanar with the fourth AC bus.

The fourth tier may be composed of the third semiconductor switch arranged coplanar with the fourth coplanar switch that is arranged coplanar with the second clamping diode that is arranged coplanar with the seventh semiconductor switch that is arranged coplanar with the eighth semiconductor switch.

The first tier may be arranged parallel to the second tier that may be arranged parallel to the third tier that may be arranged parallel to the fourth tier.

According to one aspect of the disclosure, the multi-phase power inverter may further include a first heat sink, and a second heat sink.

The first semiconductor switch, the second semiconductor switch, the fifth semiconductor switch, and the sixth semiconductor switch may be adjoined to a first side of the first power module substrate, and the first heat sink may be adjoined to a second side of the first power module substrate.

The third semiconductor switch, the fourth semiconductor switch, the seventh semiconductor switch, and the eighth semiconductor switch may be adjoined to a first side of the second power module substrate, and the second heat sink may be adjoined to the second side of the second power module substrate.

The fifth semiconductor switch and the sixth semiconductor switch may be arranged on a first portion of the first power module substrate.

The first clamping diode, and a first plurality of gate/source pins may be arranged on a second portion of the first power module substrate.

The first semiconductor switch and the second semiconductor switch may be arranged on a third portion of the first power module substrate.

The first portion, the second portion, and the third portion of the first power module substrate may be coplanar, and the second portion may be arranged between the first portion and the third portion.

The seventh semiconductor switch and the eighth semiconductor switch may be arranged on a first portion of the second power module substrate.

The second clamping diode may be arranged on a second portion of the second power module substrate.

The third semiconductor switch and the fourth semiconductor switch may be arranged on a third portion of the second power module substrate.

The first portion, the second portion, and the third portion of the second power module substrate may be coplanar, and the second portion may be arranged between the first portion and the third portion.

The first plurality of gate/source pins and the second plurality of gate/source pins may be configured to pop out vertically from the first power module substrate and the second power module substrate respectively.

The positive DC power bus and the negative DC power bus may be arranged at a first end of the X-type multilevel power converter, and the first AC bus, the second AC bus, the third AC bus, and the fourth AC bus may be arranged at a second end of the X-type multilevel power converter.

Each of the plurality of semiconductor switches may include a plurality of dies.

According to one aspect of the disclosure, a cold plate may be arranged between the second tier and the third tier of the multi-phase inverter.

According to another aspect of the disclosure, a plurality of X-type multilevel power converters arranged to transfer electric power between a high-voltage direct current (DC) power supply and an electric machine, wherein each of the plurality of X-type multilevel power converters is a solid-state integrated circuit (IC) that may include a positive DC power bus, a negative DC power bus, a neutral bus, a first alternating current (AC) bus, a second AC bus, a third AC bus, a fourth AC bus, a first conductive layer, a second conductive layer, a third conductive layer, a fourth conductive layer, a plurality of semiconductor switches, at least two first clamping diodes, and at least two second clamping diodes.

The multi-phase power inverter may further include a first heat sink, a second heat sink; a first power module substrate, and a second power module substrate.

The plurality of semiconductor switches may include a first semiconductor switch, a second semiconductor switch, a third semiconductor switch, a fourth semiconductor switch, a fifth semiconductor switch, a sixth semiconductor switch, a seventh semiconductor switch, and an eighth semiconductor switch.

The first semiconductor switch, the second semiconductor switch, the third semiconductor switch, and the fourth semiconductor switch may be connected in series between the positive DC power bus and the negative DC power bus.

The fifth semiconductor switch, the sixth semiconductor switch, the seventh semiconductor switch, and the eighth semiconductor switch may be connected in series between the positive DC power bus and the negative DC power bus.

The first semiconductor switch may be connected to the second semiconductor switch at a first node, the second semiconductor switch may be connected to the third semiconductor switch at a second node, and the third semiconductor switch may be connected to the fourth semiconductor switch at a third node.

The fifth semiconductor switch may be connected to the sixth semiconductor switch at a fourth node, the sixth semiconductor switch may be connected to the seventh semiconductor switch at a fifth node, and the seventh semiconductor switch may be connected to the eighth semiconductor switch at a sixth node.

The first clamping diode may be connected between the third node and the fourth node, and the second clamping diode may be connected between the first node and the sixth node.

The second node may be connected to the first AC bus.

The fifth node may be connected to the second AC bus.

The plurality of semiconductor switches, the positive DC power bus, the negative DC power bus, the first AC bus, the at least two first clamping diodes, and the at least two second clamping diodes may be arranged into a plurality of tiers including a first tier, a second tier, a third tier, a fourth tier, a fifth tier, and a sixth tier.

The first tier may be composed of the first conductive layer arranged coplanar with the second conductive layer.

The second tier may be composed of the first semiconductor switch arranged coplanar with the second that may be arranged coplanar with at least two first clamping diodes that may be arranged coplanar with the fifth semiconductor switch that may be arranged coplanar with the sixth semiconductor switch.

The third tier composed of the positive DC power bus may be arranged coplanar with the first AC bus that is arranged coplanar with the second AC bus.

The fourth tier may be composed of the negative DC power bus arranged coplanar with the third AC bus that may be arranged coplanar with the fourth AC bus.

The fifth tier may be composed of the third semiconductor switch arranged coplanar with the fourth semiconductor switch that may be arranged coplanar with the at least two second clamping diodes that may be arranged coplanar with the seventh semiconductor switch that may be arranged coplanar with the eighth semiconductor switch, The sixth tier may be composed of the third conductive layer arranged coplanar with the fourth conductive layer.

The first tier may be arranged parallel to the second tier that may be arranged parallel to the third tier that may be arranged parallel to the fourth tier that may be arranged parallel to the fifth that may be arranged parallel to the sixth tier.

Conductive spacers may be arranged between the fifth semiconductor switch and the positive DC power bus, the first semiconductor switch and the positive DC power bus, each of the at least two first clamping diodes and the second power module substrate, the sixth semiconductor switch and the second AC bus, and the second semiconductor switch and the first AC bus.

Conductive spacers may also be arranged between the eighth semiconductor switch and the negative DC power bus, the fourth semiconductor switch and the negative DC power bus, each of the at least two second clamping diodes and the first power module substrate, the seventh semiconductor switch and the third AC bus, and the third semiconductor switch and the fourth AC bus.

According to one aspect of the disclosure, the multi-phase power inverter may further include a first heat sink, and a second heat sink.

The first semiconductor switch, the second semiconductor switch, the fifth semiconductor switch, and the sixth semiconductor switch may be adjoined to a first side of the first power module substrate, and the first heat sink may be adjoined to a second side of the first power module substrate.

The third semiconductor switch, the fourth semiconductor switch, the seventh semiconductor switch, and the eighth semiconductor switch may be adjoined to a first side of the second power module substrate, and the second heat sink may be adjoined to the second side of the second power module substrate.

The fifth semiconductor switch, the sixth semiconductor switch, and the at least two first clamping diodes may be arranged on a first portion of the first power module substrate.

A first plurality of gate/source pins may be arranged on a second portion of the first power module substrate.

The first semiconductor switch, the second semiconductor switch, and the at least two second clamping diodes may be arranged on a third portion of the first power module substrate.

The first portion, the second portion, and the third portion of the first power module substrate may be coplanar, and the second portion may be arranged between the first portion and the third portion.

The seventh semiconductor switch, the eighth semiconductor switch, and the at least two second clamping diodes may be arranged on a first portion of the second power module substrate.

A second plurality of gate/source pins may be arranged on a second portion of the second power module substrate.

The third semiconductor switch and the fourth semiconductor switch may be arranged on a third portion of the second power module substrate.

The first portion, the second portion, and the third portion of the second power module substrate may be coplanar, and the second portion may be arranged between the first portion and the third portion.

The first plurality of gate/source pins and the second plurality of gate/source pins may pop out vertically from the first power module substrate and the second power module substrate respectively.

The positive DC power bus and the negative DC power bus may be arranged at a first end of the X-type multilevel power converter, and the first AC bus, the second AC bus, the third AC bus, and the fourth AC bus may be arranged at a second end of the X-type multilevel power converter.

Each of the plurality of semiconductor switches may include a plurality of dies.

According to one aspect of the disclosure, a cold plate may be arranged between the third tier and the fourth tier of the multi-phase inverter.

According to another aspect of the disclosure, a plurality of X-type multilevel power converters arranged to transfer electric power between a high-voltage direct current (DC) power supply and an electric machine, wherein each of the plurality of X-type multilevel power converters is a solid-state integrated circuit (IC) that may include a first positive DC power bus, a second positive DC power bus, a first negative DC power bus, a second negative DC power bus, a neutral bus, a first alternating current (AC) bus, a second AC bus, a first conductive layer, a second conductive layer, a third conductive layer, a fourth conductive layer, a plurality of semiconductor switches, at least two first clamping diodes, and at least two second clamping diodes.

The multi-phase power inverter may further include a first heat sink, a second heat sink; a first power module substrate, and a second power module substrate.

The plurality of semiconductor switches may include a first semiconductor switch, a second semiconductor switch, a third semiconductor switch, a fourth semiconductor switch, a fifth semiconductor switch, a sixth semiconductor switch, a seventh semiconductor switch, and an eighth semiconductor switch.

The first semiconductor switch, the second semiconductor switch, the third semiconductor switch, and the fourth semiconductor switch may be connected in series between the positive DC power bus and the negative DC power bus.

The fifth semiconductor switch, the sixth semiconductor switch, the seventh semiconductor switch, and the eighth semiconductor switch may be connected in series between the positive DC power bus and the negative DC power bus.

The first semiconductor switch may be connected to the second semiconductor switch at a first node, the second semiconductor switch may be connected to the third semiconductor switch at a second node, and the third semiconductor switch may be connected to the fourth semiconductor switch at a third node.

The fifth semiconductor switch may be connected to the sixth semiconductor switch at a fourth node, the sixth semiconductor switch may be connected to the seventh semiconductor switch at a fifth node, and the seventh semiconductor switch may be connected to the eighth semiconductor switch at a sixth node.

The at least two first clamping diodes may be connected between the third node and the fourth node, and the at least two second clamping diodes may be connected between the first node and the sixth node.

The second node may be connected to the first AC bus.

The fifth node may be connected to the second AC bus.

The plurality of semiconductor switches, the positive DC power bus, the negative DC power bus, the first AC bus, the at least two first clamping diodes, and the at least two second clamping diodes may be arranged into a plurality of tiers including a first tier, a second tier, a third tier, a fourth tier, and a fifth tier.

The first tier may be composed of the fifth semiconductor switch arranged coplanar with the sixth semiconductor switch that may be arranged coplanar with the seventh semiconductor switch that may be arranged coplanar with the eighth semiconductor switch.

The second tier may be composed of the first positive DC power bus arranged coplanar the first negative DC power bus that may be arranged coplanar with the first conductive layer that may be arranged coplanar with second conductive layer that may be coplanar with the first AC bus.

The third tier may be composed of the first clamping diode arranged coplanar with the second clamping diode.

The fourth tier may be composed of the second positive DC power bus arranged coplanar with the second negative DC power bus that may be arranged coplanar with the third conductive layer that may be arranged coplanar with the fourth conductive layer that may be arranged coplanar with the second AC bus.

The fifth tier may be composed of the first semiconductor switch arranged coplanar with the second semiconductor switch that may be arranged coplanar with the third semiconductor switch that may be arranged coplanar with the fourth semiconductor switch.

The multi-phase power inverter may further include a first heat sink, a second heat sink, a first power module substrate, and a second power module substrate.

The fifth semiconductor switch, the sixth semiconductor switch, the seventh semiconductor switch, and the eighth semiconductor switch may be adjoined to a first side of the first power module substrate, and the first heat sink may be adjoined to a second side of the first power module substrate.

The first semiconductor switch, the second semiconductor switch, the third semiconductor switch, and the fourth semiconductor switch may be adjoined to a first side of the second power module substrate, and the second heat sink may be adjoined to the second side of the second power module substrate.

The fifth semiconductor switch, and the sixth semiconductor switch may be arranged on a first portion of the first power module substrate.

A first plurality of gate/source pins may be arranged on a second portion of the first power module substrate.

The seventh semiconductor switch, and the eighth semiconductor switch may be arranged on a third portion of the first power module substrate.

The first portion, the second portion, and the third portion of the first power module substrate may be coplanar, and the second portion may be arranged between the first portion and the third portion.

The first semiconductor switch, and the second semiconductor switch may be arranged on a first portion of the second power module substrate.

A second plurality of gate/source pins may be arranged on a second portion of the second power module substrate.

The third semiconductor switch and the fourth semiconductor switch may be arranged on a third portion of the second power module substrate.

The first portion, the second portion, and the third portion of the second power module substrate may be coplanar, and the second portion may be arranged between the first portion and the third portion.

According to one aspect of the disclosure, the first plurality of gate/source pins and the second plurality of gate/source pins may pop out vertically from the first power module substrate and the second power module substrate respectively.

The positive DC power bus and the negative DC power bus may be arranged at a first end of the X-type multilevel power converter, and the first AC bus, the second AC bus, the third AC bus, and the fourth AC bus may be arranged at a second end of the X-type multilevel power converter.

Each of the plurality of semiconductor switches may include a plurality of dies.

By configuring the topology within each of the X-type multilevel converters as illustrated above, both the positive DC power bus and the negative DC power bus are parallel with the auxiliary or neutral bus generating mutual inductance cancellation that minimizes parasitic inductance by coupling positive mutual inductance and negative mutual inductance for commutation loop currents within each of the X-type multilevel converters.

The above features and advantages, and other features and attendant advantages of this disclosure, will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

BRIEF DESCRIPTION OF THE DRAWINGS

The accompanying drawings, which are incorporated into and constitute a part of this specification, illustrate implementations of the disclosure which, taken together with the description, serve to explain the principles of the disclosure.

multilevel power converter, in accordance with one aspect of the disclosure.

Figures 6, 6A, 6B:
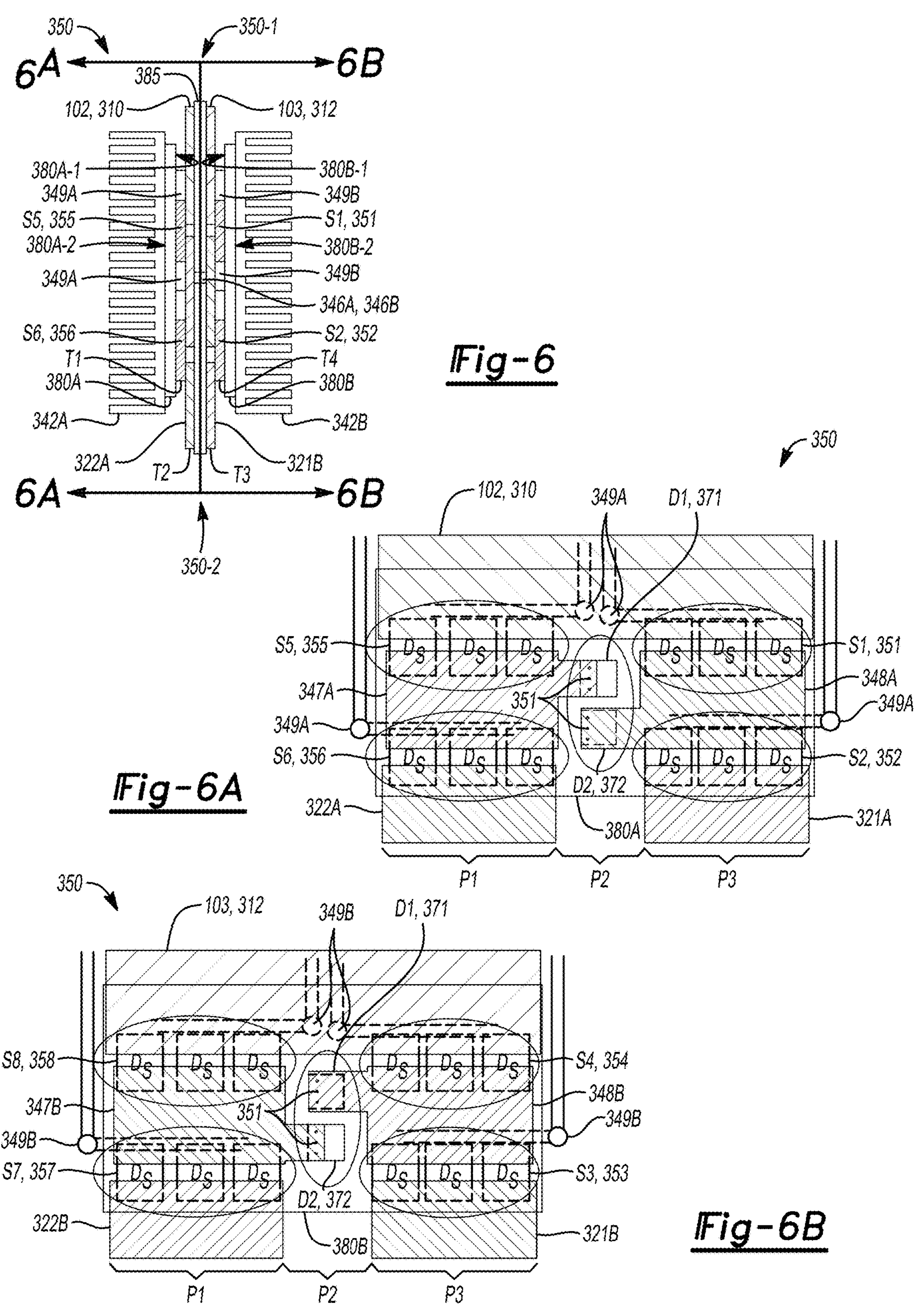

FIG. 6 schematically illustrates a side view of an X-type multilevel power converter having a first leg and a second leg, which is arranged as a solid-state IC, in accordance with one aspect of the disclosure.

FIG. 6A schematically illustrates a plan view of the first leg of the X-type multilevel power converter of FIG. 6.

FIG. 6B schematically illustrates a plan view of the second leg of the X-type multilevel power converter of FIG. 6.

Figures 7, 7A, 7B:
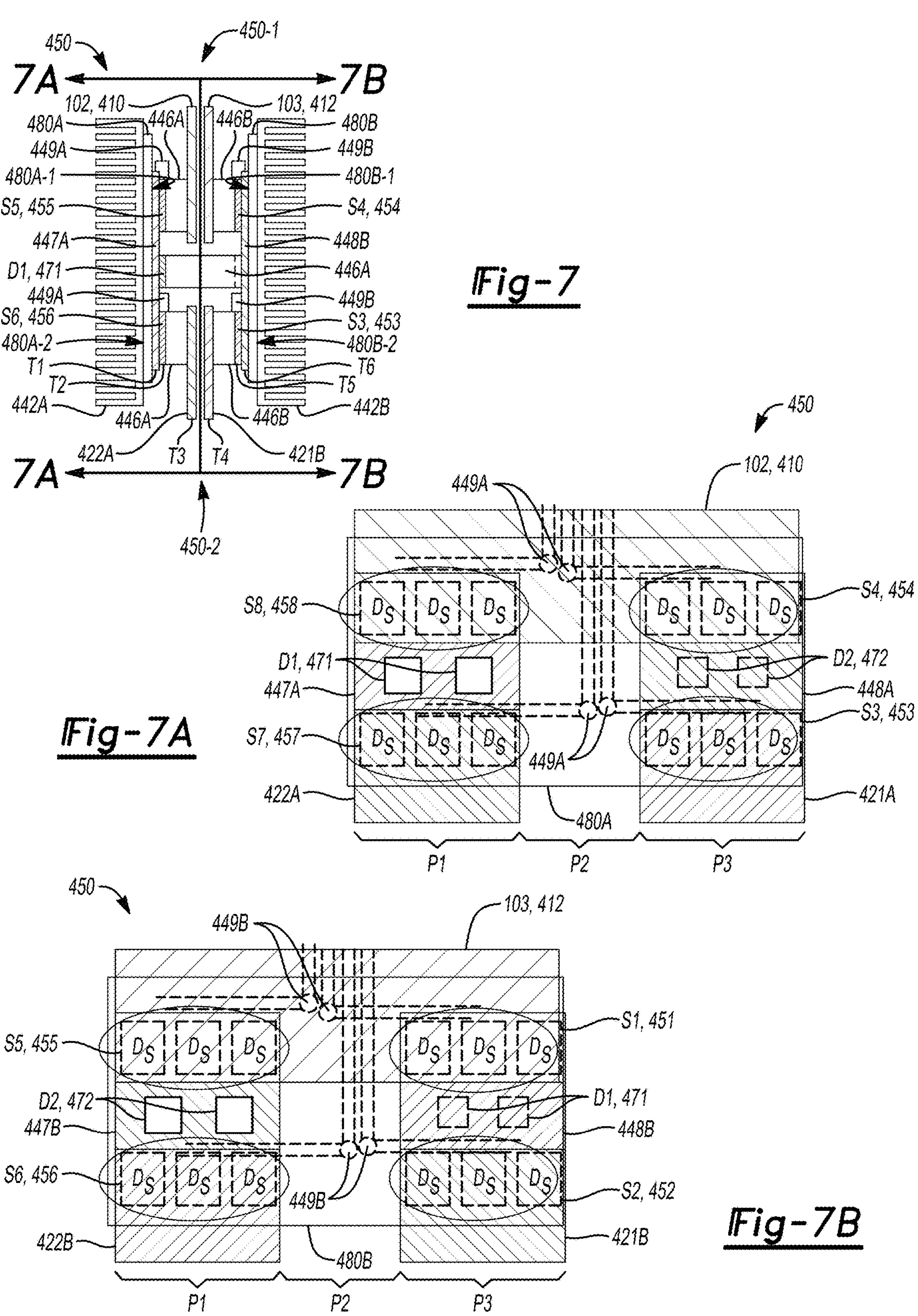

FIG. 7 schematically illustrates a side view of an X-type multilevel power converter having a first leg and a second leg, which is arranged as a solid-state IC, in accordance with one aspect of the disclosure.

FIG. 7A schematically illustrates a plan view of the first leg of the X-type multilevel power converter of FIG. 7.

FIG. 7B schematically illustrates a plan view of the second leg of the X-type multilevel power converter of FIG. 7.

Figures 8, 8A, 8B:
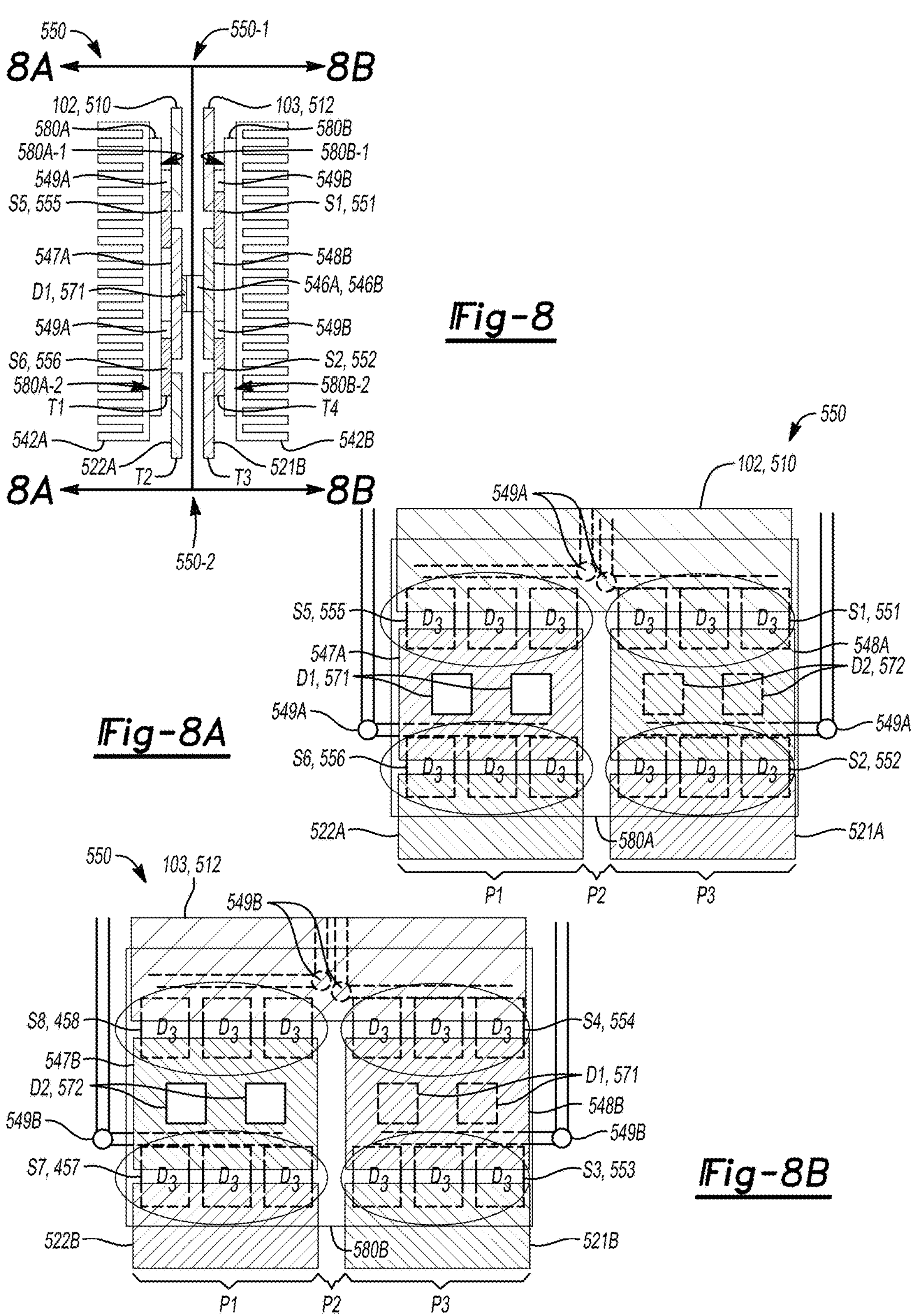

FIG. 8 schematically illustrates a side view of an X-type multilevel power converter having a first leg and a second leg, which is arranged as a solid-state IC, in accordance with one aspect of the disclosure.

FIG. 8A schematically illustrates a plan view of the first leg of the X-type multilevel power converter of FIG. 8.

FIG. 8B schematically illustrates a plan view of the second leg of the X-type multilevel power converter of FIG. 8.

Figures 9, 9A, 9B:
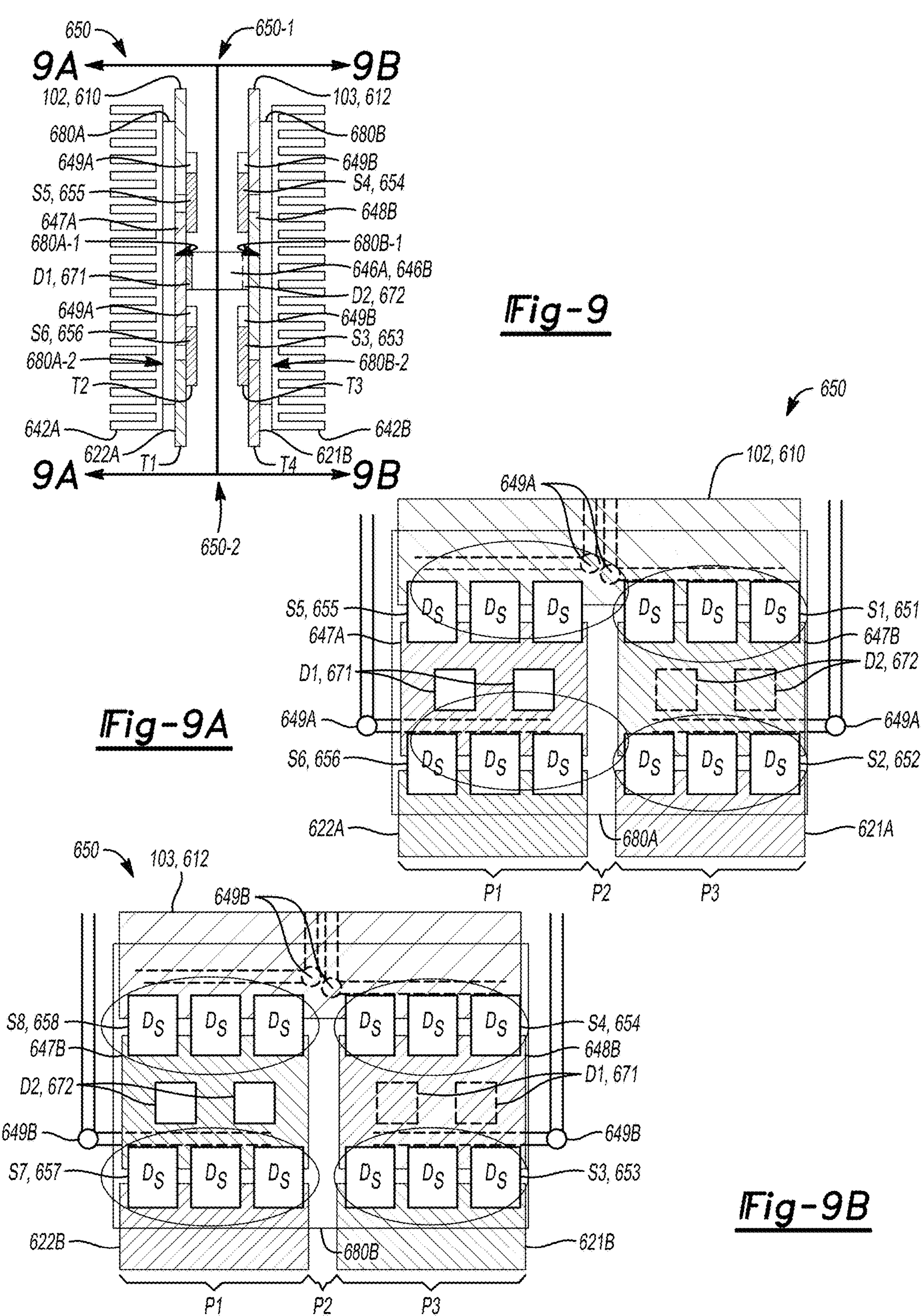

FIG. 9 schematically illustrates a side view of an X-type multilevel power converter having a first leg and a second leg, which is arranged as a solid-state IC, in accordance with one aspect of the disclosure.

FIG. 9A schematically illustrates a plan view of the first leg of the X-type multilevel power converter of FIG. 9.

FIG. 9B schematically illustrates a plan view of the second leg of the X-type multilevel power converter of FIG. 9.

Figures 10, 10A, 10B:
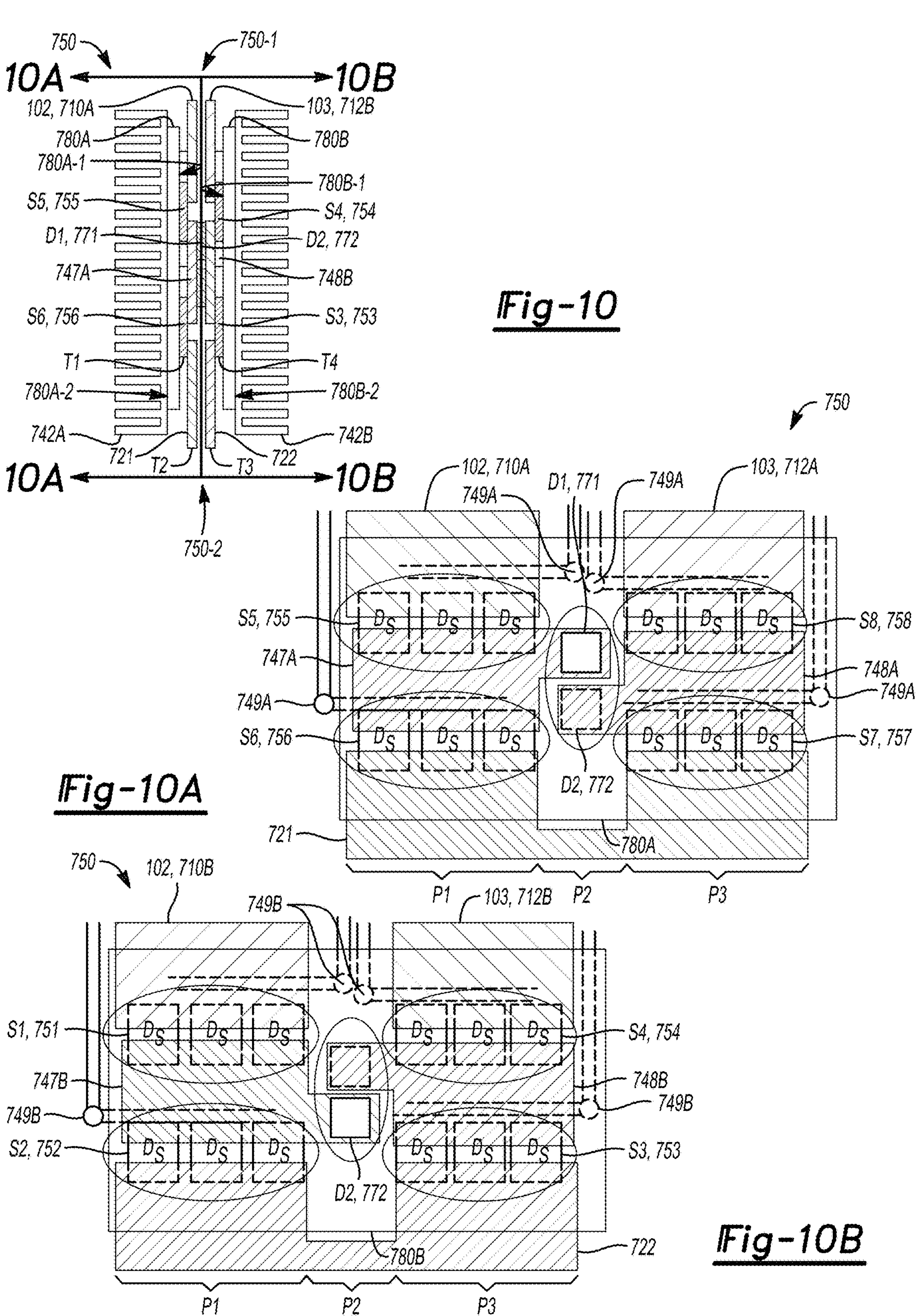

FIG. 10 schematically illustrates a side view of an X-type multilevel power converter having a first leg and a second leg, which is arranged as a solid-state IC, in accordance with one aspect of the disclosure.

FIG. 10A schematically illustrates a plan view of the first leg of the X-type multilevel power converter of FIG. 10.

FIG. 10B schematically illustrates a plan view of the second leg of the X-type multilevel power converter of FIG. 10.

Figures 11, 11A, 11B:
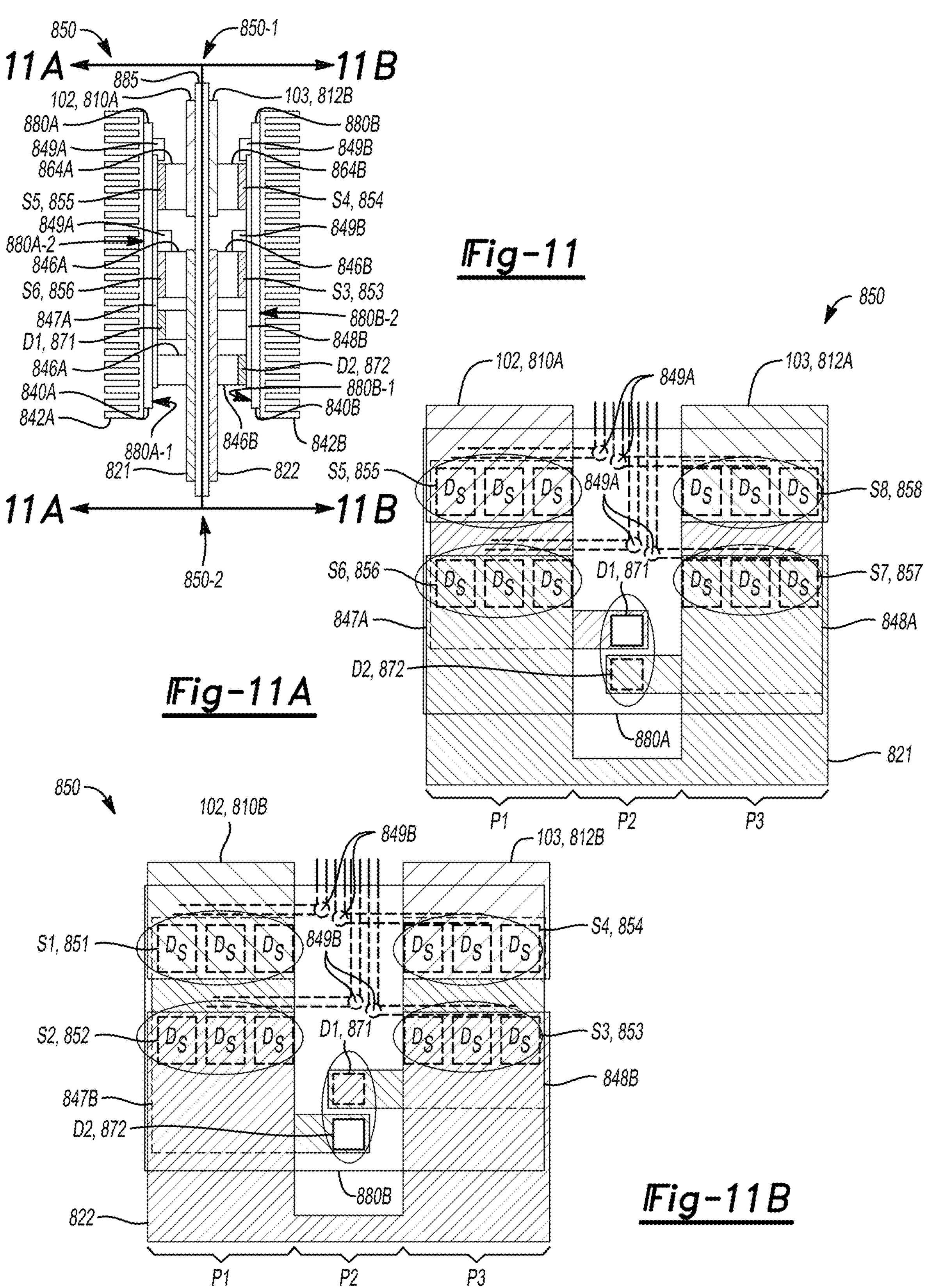

FIG. 11 schematically illustrates a side view of an X-type multilevel power converter having a first leg and a second leg, which is arranged as a solid-state IC, in accordance with one aspect of the disclosure.

FIG. 11A schematically illustrates a plan view of the first leg of the X-type multilevel power converter of FIG. 11.

FIG. 11B schematically illustrates a plan view of the second leg of the X-type multilevel power converter of FIG. 11.

Figures 12, 12A, 12B:
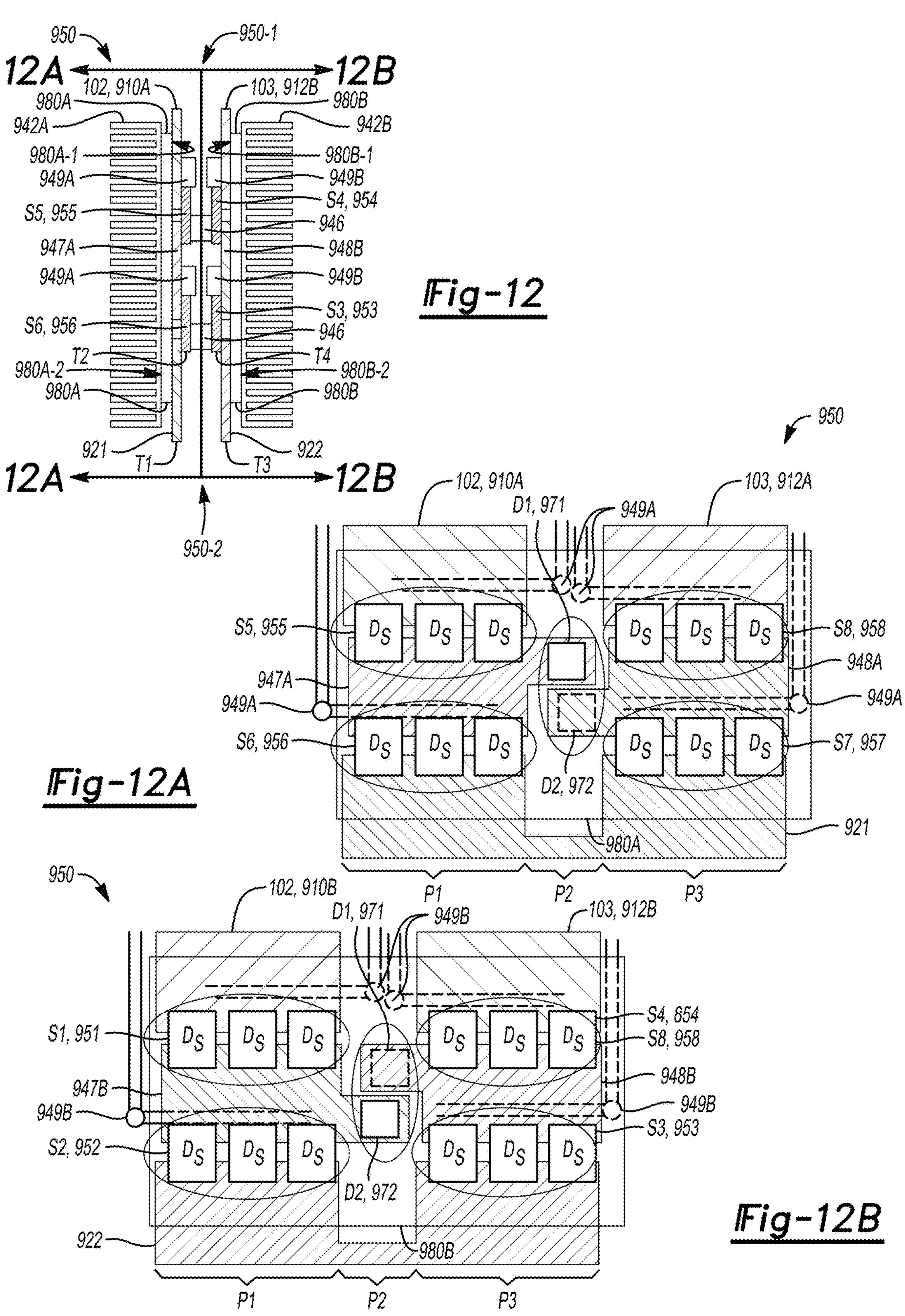

FIG. 12 schematically illustrates a side view of an X-type multilevel power converter having a first leg and a second leg, which is arranged as a solid-state IC, in accordance with one aspect of the disclosure.

FIG. 12A schematically illustrates a plan view of the first leg of the X-type multilevel power converter of FIG. 12.

FIG. 12B schematically illustrates a plan view of the second leg of the X-type multilevel power converter of FIG. 12.

The appended drawings are not necessarily to scale and may present a somewhat simplified representation of various preferred features of the present disclosure as disclosed herein, including, for example, specific dimensions, orientations, locations, and shapes. Details adjacent to such features will be determined in part by the particular intended application and use environment.

DETAILED DESCRIPTION

The components of each aspect of the disclosure, as described and illustrated herein, may be arranged and designed in a variety of different configurations. Thus, the following detailed description is not intended to limit the scope of the disclosure, as claimed, but is merely representative of possible aspect of the disclosure thereof. In addition, while numerous specific details are set forth in the following description in order to provide a thorough understanding of each aspect of the disclosure disclosed herein, some aspects of the disclosure may be practiced without some of these details. Moreover, for the purpose of clarity, certain technical material that is understood in the related art has not been described in detail in order to avoid unnecessarily obscuring the disclosure. Furthermore, the disclosure, as illustrated and described herein, may be practiced in the absence of an element that is not specifically disclosed herein.

The present disclosure is susceptible to embodiment in many different forms. Representative examples of the disclosure are shown in the drawings and described herein in detail as non-limiting examples of the disclosed principles. To that end, elements and limitations described herein, but not explicitly set forth in the claims, are not to be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, and the words "including," "containing," "comprising," "having," and the like shall mean "including without limitation." Moreover, words of approximation such as "about," "almost," "substantially," "generally," "approximately," etc., may be used herein in the sense of "at, near, or nearly at," or "within 0-5% of," or "within acceptable manufacturing tolerances," or logical combinations thereof.

As used herein, the term "system" refers to mechanical and electrical hardware, software, firmware, electronic control componentry, processing logic, and/or processor device, individually or in combination, including without limitation: application specific integrated circuit (ASIC), an electronic circuit, a processor (shared, dedicated, or group) that executes one or more software or firmware programs, memory device(s) that electrically store software or firmware instructions, a combinatorial logic circuit, and/or other components that provide the described functionality.

As employed herein, terms such as "vertical", "horizontal", "left", "right", "upper", "lower", "top", "bottom" and similar expressions are non-limiting terms that merely describe the various elements as illustrated in the Figures and are not intended to limit the scope of the disclosure.

As used herein, the term "electric machine" refers to an electric motor/generator device including a rotor and a stator that is capable of converting electric power to mechanical power and/or converting mechanical power to electric power by electromagnetic effort.

Figure 1:
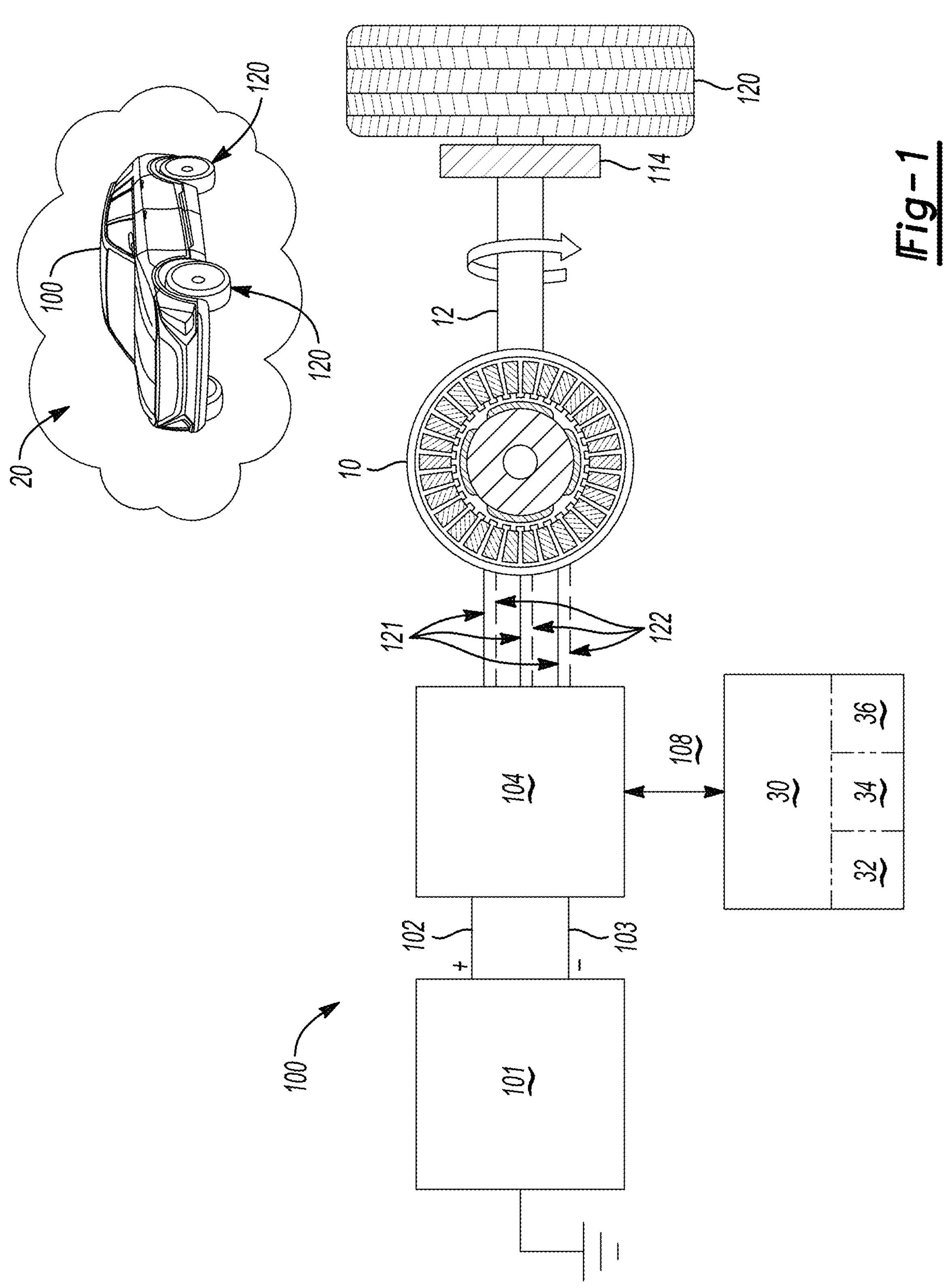
FIG. 1 schematically illustrates an electric drivetrain system including a multi-phase power inverter that is arranged between a high-voltage direct current (DC) power source and an electric machine, in accordance with the disclosure.
Figure 2:
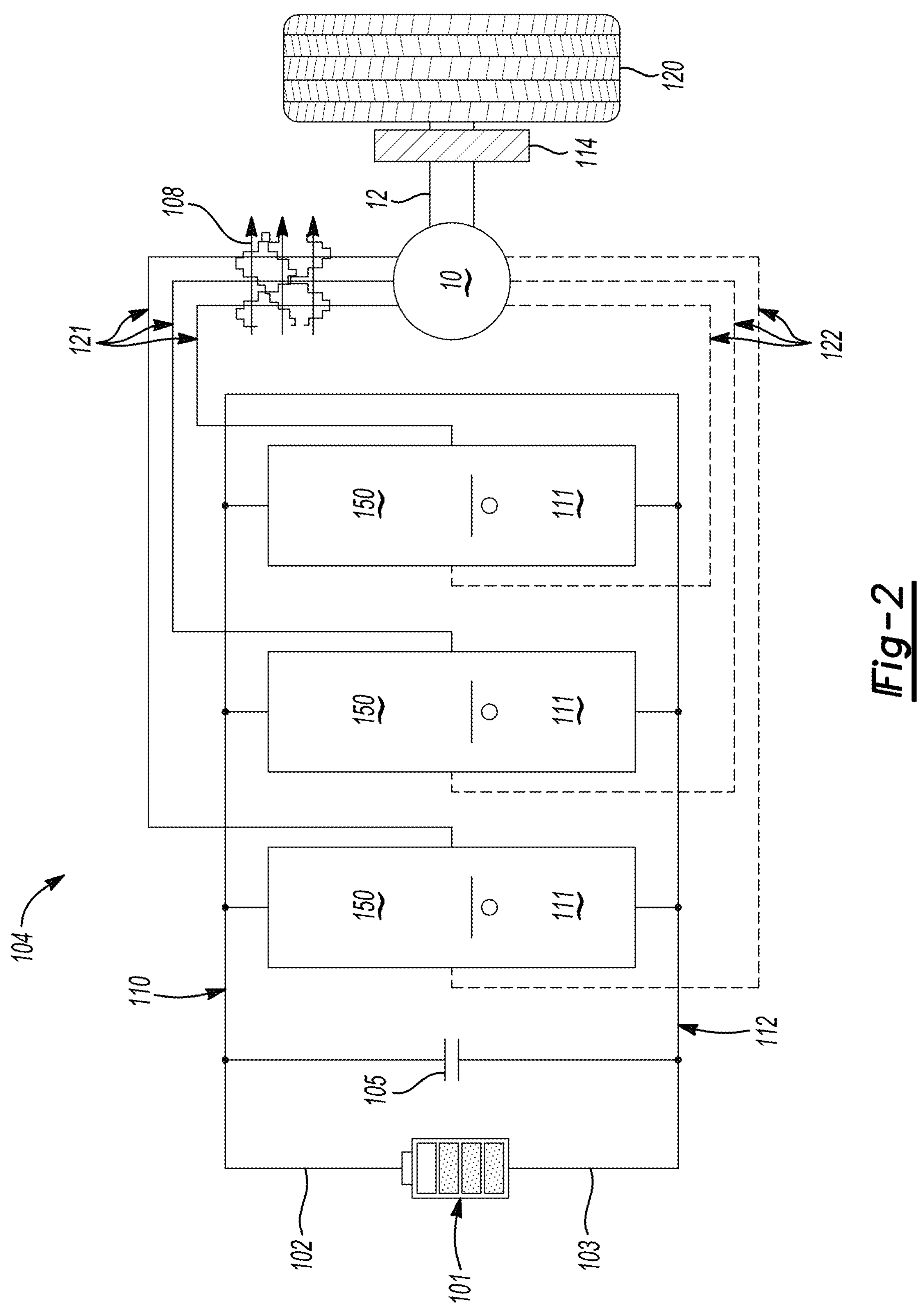
FIG. 2 schematically illustrates an electric drivetrain system including a multi-phase power inverter having a plurality of X-type multilevel power converters that are arranged between a high-voltage DC power source and an electric machine, in accordance with the disclosure.

Referring to the drawings, wherein like reference numbers refer to the same or like components in the several Figures, FIGS. 1 and 2 schematically illustrate an electric drivetrain 100 that is composed of a direct current (DC) power source 101, a multi-phase power inverter 104, a multi-phase rotary electric motor, generator, or motor-generator (electric machine) 10, and a torque actuator 120, the operations of which are monitored and controlled by a controller 30. In one aspect of the disclosure, the electric drivetrain 100 is arranged to generate and transfer torque to the torque actuator 120 in the form of one or multiple drive wheels to effect work. Controller 30 executes control routines to control and manage operation of the multi-phase power inverter 104. In one aspect of the disclosure, the electric drivetrain 100 is disposed on an electrified vehicle, schematically illustrated at 20, and capable of generating tractive torque for vehicle propulsion. When disposed on the electrified vehicle 20, the electrified vehicle 20 may include, but not be limited to a mobile platform in the form of a commercial vehicle, industrial vehicle, agricultural vehicle, passenger vehicle, aircraft, watercraft, train, all-terrain vehicle, personal movement apparatus, robot and the like to accomplish the purposes of this disclosure. Alternatively, the electric drivetrain 100 may be an element of a stationary system.

The controller 30 may be embodied as one or more digital computing devices, and may include one or more processors 34 and memory 32. A control routine 36 may be stored as an executable instruction set in the memory 32 and executed by one of the processors 34 of the controller 30. The controller 30 is in communication with the multi-phase power inverter 104 to control operation thereof in response to execution of the control routine 36 to operate the electric machine 10. The multi-phase power inverter 104 exchanges or transfers electric power to the electric machine 10 via a plurality of first AC power buses 121 and second AC power buses 122.

The term "controller" and related terms such as microcontroller, control module, module, control, control unit, processor and similar terms refer to one or various combinations of Application Specific Integrated Circuit(s) (ASIC), Field-Programmable Gate Array (FPGA), electronic circuit (s), central processing unit(s), e.g., microprocessor(s) and associated memory component(s) in the form of transitory and/or non-transitory memory component(s) and storage devices (read only, programmable read only, random access, hard drive, etc.). The non-transitory memory component is capable of storing machine readable instructions in the form of one or more software or firmware programs or routines, combinational logic circuit(s), input/output circuit(s) and devices, signal conditioning and buffer circuitry and other components that may be accessed by one or more processors to provide a described functionality. Input/output circuit(s) and devices include analog/digital inverters and related devices that monitor inputs from sensors, with such inputs monitored at a preset sampling frequency or in response to a triggering event. Software, firmware, programs, instructions, control routines, code, algorithms and similar terms mean controller-executable instruction sets including calibrations and look-up tables.

The electric machine 10 includes a cylindrically-shaped rotor assembly arranged on a rotor shaft and disposed within an annularly-shaped stator, wherein the rotor assembly is coaxial with a rotor opening that is formed in the stator. Other elements of the electric machine 10, e.g., end caps, shaft bearings, electrical connections, etc., are included but not shown. Electrical windings of the stator are arranged with a quantity of electrical phases and a quantity of electrical turns per phase. Depending on the specific arrangement, the quantity of electrical phases may be between 3 and 6, and the quantity of layers of conductors may be between 4 and 12.

The multi-phase power inverter 104 includes a plurality of semiconductor switches (illustrated with reference to FIG. 3, et seq.) that are arranged and controllable to transform direct current (DC) electric power to alternating current (AC) electric power, and transform AC electric power to DC electric power, employing a pulse-width modulation signal 108 or another control technique. The multi-phase power inverter 104 is arranged and is controllable to transform DC electric power originating from the high-voltage DC power source 101 to AC electric power to actuate the electric machine 10 via electromagnetic effort. The electric machine 10 is controllable to rotate and generate mechanical torque that is transferred via a rotatable member 12 and a geartrain 114 to the torque actuator 120 when operating in a torque generating mode. The electric machine 10 is controllable to generate AC electric power from mechanical torque originating at the torque actuator 120 via electromagnetic effort, which is transformed by the multi-phase power inverter 104 to DC electric power for storage in the high-voltage DC power source 101 when operating in an electric power generating mode. The torque actuator 120 includes, in one aspect of the disclosure, a vehicle wheel that transfers torque to a ground surface to effect forward motion as part of a traction propulsion system. The high-voltage DC power source 101 may be in the form of a rechargeable electrochemical battery device, a fuel cell, an ultracapacitor, and/or another electrical energy storage/generation technology.

The high-voltage DC power source 101 may be a rechargeable electrochemical battery device, a fuel cell, an ultracapacitor, and/or another electrical energy storage/generation technology. The high-voltage DC power source 101 connects to the multi-phase power inverter 104 via a high-voltage DC bus having a positive link 102 and a negative link 103, and the multi-phase power inverter 104 connects to the electric machine 10 via a plurality of first AC power buses 121 and second AC power buses 122 to transfer the pulse-width modulation signal 108.

As illustrated with reference to FIG. 2, the multi-phase power inverter 104 of the electric drivetrain 100 is composed with a plurality of X-type multilevel power converters 150 that are arranged between the high-voltage DC power source 101 and the electric machine 10, with a DC-link capacitor 105 between the high-voltage DC power source 101 and the multi-phase power inverter 104 of the electric drivetrain 100, and with respective first AC power buses 121 and second AC power buses 122. As illustrated, and in one non-limiting aspect of the disclosure, the multi-phase power inverter 104 of the electric drivetrain 100 is composed with a quantity of three of the X-type multilevel power converters 150.

Figure 3:
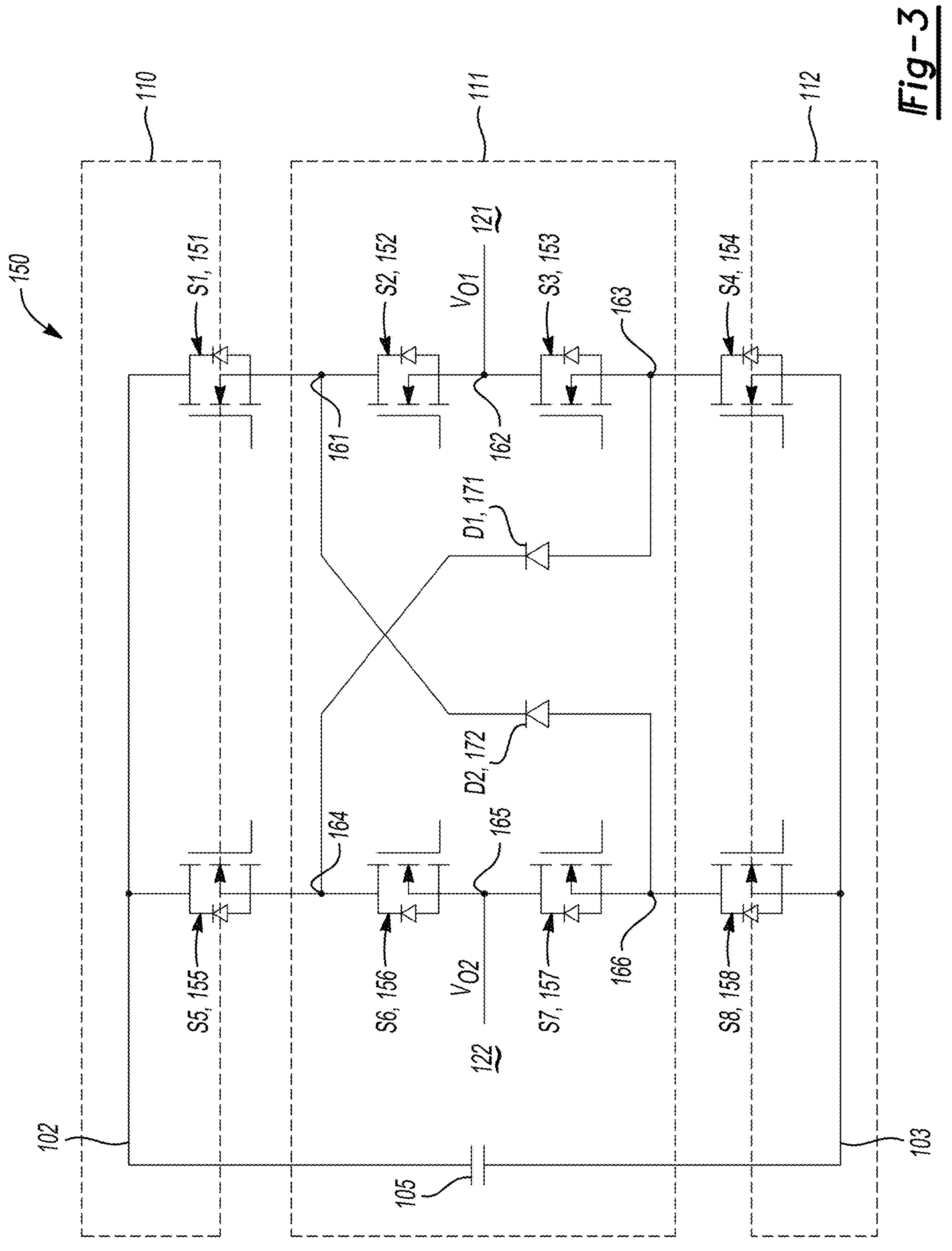
FIG. 3 schematically illustrates an electrical circuit diagram of an X-type multilevel power converter that is arranged as a solid-state integrated circuit (IC), in accordance with one aspect of the disclosure.

FIG. 3 schematically illustrates one of the X-type multilevel power converters 150, which is arranged as a solid-state integrated circuit (IC) having a plurality of semiconductor switches that are disposed in a laterally sectioned arrangement. The plurality of semiconductor switches includes, in one aspect of the disclosure and as shown, a first semiconductor switch S1 151, a second semiconductor switch S2 152, a third semiconductor switch S3 153, a fourth semiconductor switch S4 154, a fifth semiconductor switch S5 155, a sixth semiconductor switch S6 156, a seventh semiconductor switch S7 157, and an eighth semiconductor switch S8 158. In one aspect of the disclosure, at least a portion of the semiconductor switches are field-effect transistors (FETs). In one aspect of the disclosure, the FETs are gallium nitride (GaN) transistors. In one aspect of the disclosure, at least a portion of the semiconductor switches are insulated-gate bipolar transistors (IGBTs).

Other constituent elements of the X-type multilevel power converter 150 includes a first clamping diode D1 171, a second clamping diode D2 172, a positive DC power bus 110, a neutral bus 111, and a negative DC power bus 112. The positive DC power bus 110 is connected to the positive link 102 of the high-voltage DC bus, and the negative DC power bus 112 is connected to the negative link 103 of the high-voltage DC bus.

The first semiconductor switch S1 151, the second semiconductor switch S2 152, third semiconductor switch S3 153, and the fourth semiconductor switch S4 154 are arranged in series between the positive DC power bus 110 and the negative DC power bus 112. This includes: the first semiconductor switch S1 151 being connected to the second semiconductor switch S2 152 at first node 161; the second semiconductor switch S2 152 being connected to the third semiconductor switch S3 153 at second node 162; the third semiconductor switch S3 153 being connected to the fourth semiconductor switch S4 154 at third node 163.

The fifth semiconductor switch S5 155, sixth semiconductor switch S6 156, seventh semiconductor switch S7 157, and eighth semiconductor switch S8 158 are arranged in series between the positive DC power bus 110 and the negative DC power bus 112. This includes: the fifth semiconductor switch S5 155 being connected to the sixth semiconductor switch S6 156 at fourth node 164; the sixth semiconductor switch S6 156 being connected to the seventh semiconductor switch S7 157 at fifth node 165; and the seventh semiconductor switch S7 being connected to the eighth semiconductor switch S8 158 at sixth node 166.

A first clamping diode D1 171 is arranged between the fourth node 164 and the third node 163, with the anode of the first clamping diode D1 171 being connected to the fourth node 164 and the cathode of the first clamping diode D1 171 being connected to the third node 163.

A second clamping diode D2 172 is arranged between the first node 161 and the sixth node 166, with the anode of the second clamping diode D2 172 being connected to the sixth node 166 and the cathode of the second clamping diode D2 172 being connected to the first node 161.

The first node 161 connects to the first AC power bus 121 to transfer power to the electric machine 10 (shown with reference to FIG. 2).

The second node 162 connects to the second AC power bus 122 to transfer power to the electric machine 10 (shown with reference to FIG. 2).

A positive DC power bus 110, a neutral power bus 111, and a negative DC power bus 112, are schematically illustrated.

Figures 4, 4A, 4B:
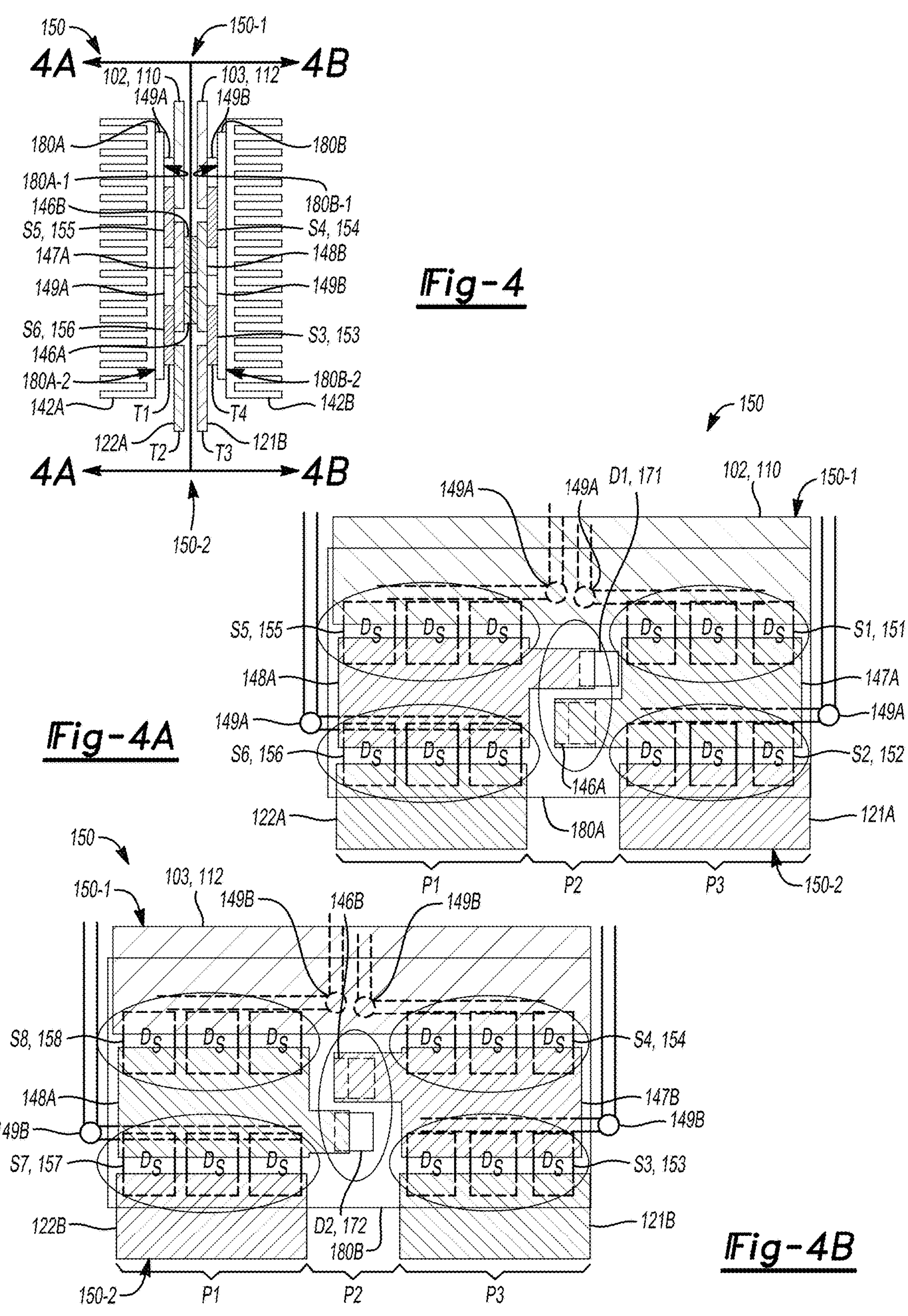
FIG. 4 schematically illustrates a side view of an X-type multilevel power converter having a first leg and a second leg, which is arranged as a solid-state IC, in accordance with one aspect of the disclosure.
FIG. 4A schematically illustrates a plan view of the first leg of the X-type multilevel power converter of FIG. 4.
FIG. 4B schematically illustrates a plan view of the second leg of the X-type multilevel power converter of FIG. 4.

As schematically illustrated in FIGS. 4, 4B, and 4C with continued reference to FIG. 3, an X-type multilevel power converter 150 includes a plurality of semiconductor switches disposed in a laterally tiered arrangement on power module substrates 180A, 180B. The plurality of semiconductor switches includes, in one aspect of the disclosure and as shown, a first semiconductor switch S1 151, a second semiconductor switch S2 152, a third semiconductor switch S3 153, a fourth semiconductor switch S4 154, a fifth semiconductor switch S5 155, a sixth semiconductor switch S6 156, a seventh semiconductor switch S7 157, and an eighth semiconductor switch S8 158.

The plurality of semiconductor switches, the first clamping diode D1 171, and the second clamping diode D2 172 are interconnected by a plurality of interconnections (not shown) on the first and second power module substrates 180A, 180B.

The interconnections may include but are not limited to one or more of wire bonding, ribbon bonding, clip bonding, and direct copper bus bonding.

The X-type multilevel power converter 150 includes a positive DC power bus 110, a negative DC power bus 112, a first alternating current (AC) bus 121, a second AC power bus 122, a first clamping diode D1 171, a second clamping diode D2 172, a first power module substrate 180A, a second power module substrate 180B, a first heat sink 142A adjacent to a first side 180A-1 of the first power module substrate 180A, and a second heat sink 142B adjacent to a first side 180B-1 of the second power module substrate 180B.

A first conductive spacer 146A is arranged between the first clamping diode D1 171 and a second side 180A-2 of the first power module substrate 180A.

A second conductive spacer 146B is arranged between the second clamping diode D2 172 and a second side 180B-2 of the second power module substrate 180B.

The X-type multilevel power converter 150 includes a plurality of semiconductor switches including a first semiconductor switch S1 151, a second semiconductor switch S2 152, a third semiconductor switch S3 153, a fourth semiconductor switch S4 154, a fifth semiconductor switch S5 155, a sixth semiconductor switch S6 156, a seventh semiconductor switch S7 157, and an eighth semiconductor switch S8 158.

The first semiconductor switch S1 151, the second semiconductor switch S2 152, the third semiconductor switch S3 153, and the fourth semiconductor switch S4 154 are connected in series between the positive DC power bus 110 and the negative DC power bus 112.

The first semiconductor switch S1 151 is connected to the second semiconductor switch S2 152 at a first node 161. The second semiconductor switch S2 152 is connected to the third semiconductor switch S3 153 at a second node 162, and the third semiconductor switch S3 153 is connected to the fourth semiconductor switch S4 154 at a third node 163.

The fifth semiconductor switch S5 155, the sixth semiconductor switch S6 156, the seventh semiconductor switch S7 157, and the eighth semiconductor switch S8 158 is connected in series between the positive DC power bus 110 and the negative DC power bus 112.

The fifth semiconductor switch S5 155 is connected to the sixth semiconductor switch S6 156 at a fourth node 164. The sixth semiconductor switch S6 156 is connected to the seventh semiconductor switch S7 157 at a fifth node 165, and the seventh semiconductor switch S7 157 is connected to the eighth semiconductor switch S8 158 at a sixth node 166.

The first clamping diode D1 171 is connected between the third node 163 and the fourth node 164. The second clamping diode D2 172 is connected between the first node 161 and the sixth node 166.

The second node 162 is connected to the first AC power bus 121 and the fifth node 165 is connected to the second AC power bus 122.

Each of the plurality of semiconductor switches may include a plurality of semiconductor dies $D_S$ that include a plurality of gate/source control terminals or pins 149A, 149B. While each semiconductor switch is illustrated as including three semiconductor dies $D_S$, it should be appreciated that each semiconductor switch could include more than three or less than three semiconductor dies $D_S$ based on the individual application requirements.

The plurality of semiconductor switches, the positive DC power bus 110, the negative DC power bus 112, the first AC bus 121A, the second AC bus 122A, the first clamping diode D1 171, and the second clamping diode D2 172 are arranged into a plurality of tiers including a first tier T1, a second tier T2, a third tier T3, and a fourth tier T4.

The first tier T1 is composed of the first semiconductor switch S1 151 arranged coplanar with the second semiconductor switch S2 152 that is arranged coplanar with first clamping diode D1 171 that is arranged coplanar with the fifth semiconductor switch S5 155 that is arranged coplanar with the sixth semiconductor switch S6 156.

The second tier T2 is composed of the positive DC power bus 110 arranged coplanar with the first conductive layer 147A that is arranged coplanar with the second conductive layer 148A that is arranged coplanar with the first AC bus 121A that is arranged coplanar with the second AC bus 122A.

The third tier T3 is composed of the negative DC power bus 112 arranged coplanar with the third conductive layer 147B that is arranged coplanar with the fourth second conductive layer 148B that is arranged coplanar with the third AC bus 121B that is arranged coplanar with the fourth AC bus 122B.

The fourth tier T4 is composed of the third semiconductor switch S3 153 arranged coplanar with the fourth semiconductor switch S4 154 that is arranged coplanar with the second clamping diode D2 172 that is arranged coplanar with the seventh semiconductor switch S7 157 that is arranged coplanar with the eighth semiconductor switch S8 158.

The first tier T1 is arranged parallel to the second tier T2 that is arranged parallel to the third tier T3 that is arranged parallel to the fourth tier T4.

The first semiconductor switch S1 151, the second semiconductor switch S2 152, the fifth semiconductor switch S5 155, and the sixth semiconductor switch S6 156 are adjoined to a first side 180A-1 of the first power module substrate 180A, and the first heat sink 142A is adjoined to a second side 180A-2 of the first power module substrate 180A. The second side 180A-2 being opposite the first side 180A-1.

The third semiconductor switch S3 153, the fourth semiconductor switch S4 154, the seventh semiconductor switch S7 157, and the eighth semiconductor switch S8 158 are adjoined to a first side 180B-1 of the first power module substrate 180B, and the second heat sink 142B is adjoined to a second side 180B-2 of the first power module substrate 180B. The second side 180B-2 being opposite the first side 180B-1.

As schematically illustrated in FIG. 4A, the fifth semiconductor switch S5 155 and the sixth semiconductor switch S6 156 are arranged on a first portion P1 of the first power module substrate 180A The first clamping diode D1 171 and a first plurality of gate/source pins 149A are arranged on a second portion P2 of the first power module substrate 180A.

The first semiconductor switch S1 151 and the second semiconductor switch S2 152 are arranged on a third portion P3 of the first power module substrate 180A.

The first portion P1, the second portion P2, and the third portion P3 of the first power module substrate 180A are coplanar, the second portion P2 being arranged between the first portion P1 and the third portion P3.

As schematically illustrated in FIG. 4B, the seventh semiconductor switch S7 157 and the eighth semiconductor switch S8 158 are arranged on a first portion P1 of the second power module substrate 180B.

The second clamping diode D2 172 and a second plurality of gate/source pins 149B are arranged on a second portion P2 of the second power module substrate 180B.

The third semiconductor switch S3 153 and the fourth semiconductor switch S4 154 are arranged on a third portion P3 of the second power module substrate 180B.

The first portion P1, the second portion P2, and the third portion P3 of the second power module substrate 180B are coplanar, the second portion P2 being arranged between the first portion P1 and the third portion P3.

The first plurality of gate/source pins 149A and the second plurality of gate/source pins 149B are configured to pop out vertically from the first power module substrate 180A and the second power module substrate 180B respectively.

Each of the plurality of semiconductor switches includes a plurality of dies $D_S$, and, while each of the plurality of semiconductor switches are illustrated as having three dies in parallel, it should be appreciated that the number of dies in each semiconductor switch can vary depending on the individual application requirements.

The positive DC power bus 110 and the negative DC power bus 112 are arranged at a first end 150-1 of the X-type multilevel power converter 150, while the first AC bus 121A, the second AC bus 122A, the third AC bus 121B, and the fourth AC bus 122B are arranged at a second end 150-2 of the X-type multilevel power converter 150.

The multilevel X-type power converter 150 may also include a cold plate (not shown) arranged between the second tier T2 and the third tier T3, as illustrated at 385 in FIG. 6.

Figures 5, 5A, 5B:
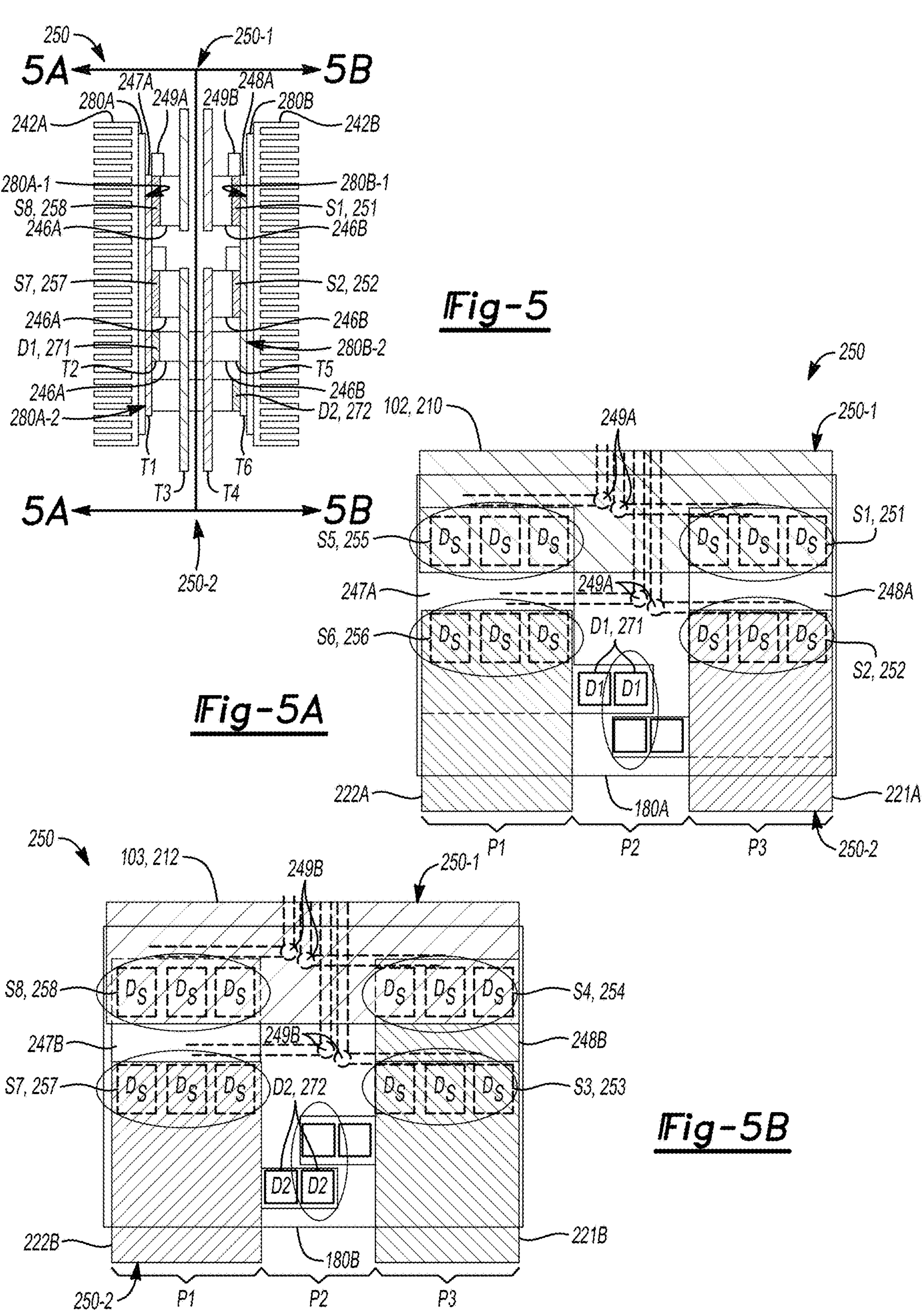
FIG. 5 schematically illustrates a side view of an X-type multilevel power converter having a first leg and a second leg, which is arranged as a solid-state IC, in accordance with one aspect of the disclosure.
FIG. 5A schematically illustrates a plan view of the first leg of the X-type multilevel power converter of FIG. 5.
FIG. 5B schematically illustrates a plan view of the second leg of the X-type multilevel power converter of FIG. 5.

According to another aspect of the disclosure, as illustrated in FIGS. 5, 5A, and 5B, the plurality of semiconductor switches, the positive DC power bus 210, the negative DC power bus 212, the first AC bus 221A, the second AC bus 222A, the third AC bus 221B, the fourth AC bus 222B, the first clamping diode D1 271, and the second clamping diode D2 272 are arranged into a plurality of tiers including a first tier T1, a second tier T2, a third tier T3, a fourth tier T4, a fifth tier T5, and a sixth tier T6.

The first tier T1 is composed of the first conductive layer 247A and the second conductive layer 248A.

The second tier T2 is composed of the first semiconductor switch S1 251 arranged coplanar with the second semiconductor switch S2 252 that is arranged coplanar with at least two first clamping diodes D1 271 that are arranged coplanar with the fifth semiconductor switch S5 255 that is arranged coplanar with the sixth semiconductor switch S6 256.

The third tier T3 is composed of the positive DC power bus 210 arranged coplanar with the first AC bus 221A that is arranged coplanar with the second AC bus 222A.

The fourth tier T4 is composed of the negative DC power bus 212 arranged coplanar with the third AC bus 221B that is arranged coplanar with the fourth AC bus 222B.

The fifth tier T5 is composed of the third semiconductor switch S3 253 arranged coplanar with the fourth semiconductor switch S4 254 that is arranged coplanar with the at least two second clamping diodes D2 272 that are arranged coplanar with the seventh semiconductor switch S7 257 that is arranged coplanar with the eighth semiconductor switch S8 258.

The sixth tier T6 is comprised of the third conductive layer 248B and the fourth conductive layer 247B.

The first tier T1 is arranged parallel to the second tier T2 that is arranged parallel to the third tier T3 that is arranged parallel to the fourth tier T4 that is arranged parallel to the fifth tier T5 that is arranged parallel to the sixth tier T6.

The first conductive layer 247A and the second conductive layer 248A are adjoined to a first side 280A-1 of a first power module substrate 280A, and a first heat sink 242A is adjoined to a second side 280A-2 of the first power module substrate 280A. The second side 280A-2 being opposite the first side 280A-1.

The third conductive layer 248B and the fourth conductive layer 247B are adjoined to a first side 280B-1 of a second power module substrate 280B, and a first heat sink 242B is adjoined to a second side 280B-2 of the second power module substrate 280B. The second side 280B-2 being opposite the first side 280B-1.

Conductive spacers 246A are arranged between the fifth semiconductor switch S5 255, and the positive DC power bus 210, the first semiconductor switch S1 251 and the positive DC power bus 210, each of the at least two first clamping diodes D1 271 and the second power module substrate 280B, the sixth semiconductor switch S6 256 and the second AC bus 222A, and the second semiconductor switch S2 252 and the first AC bus 221A.

Conductive spacers 246B are arranged between the eighth semiconductor switch S8 258 and the negative DC power bus 212, the fourth semiconductor switch S4 254 and the negative DC power bus 212, each of the at least two second clamping diodes D2 272 and the first power module substrate 280A, the seventh semiconductor switch S7 257 and the third AC bus 221B, and the third semiconductor switch S3 253 and the fourth AC bus 222B.

As schematically illustrated in FIG. 5A, the fifth semiconductor switch S5 255 and the sixth semiconductor switch S6 256 are arranged on a first portion P1 of the first power module substrate 280A The at least two first clamping diodes D1 271 and a first plurality of gate/source pins 249A are arranged on a second portion P2 of the first power module substrate 280A.

The first semiconductor switch S1 251 and the second semiconductor switch S2 252 are arranged on a third portion P3 of the first power module substrate 280A.

The first portion P1, the second portion P2, and the third portion P3 of the first power module substrate 280A are coplanar, the second portion P2 being arranged between the first portion P1 and the third portion P3.

As schematically illustrated in FIG. 5B, the seventh semiconductor switch S7 257 and the eighth semiconductor switch S8 258 are arranged on a first portion P1 of the second power module substrate 280B.

The at least two second clamping diodes D2 272 and a second plurality of gate/source pins 249B are arranged on a second portion P2 of the second power module substrate 280B.

The third semiconductor switch S3 253 and the fourth semiconductor switch S4 254 are arranged on a third portion P3 of the second power module substrate 280B.

The first portion P1, the second portion P2, and the third portion P3 of the second power module substrate 280B are coplanar, the second portion P2 being arranged between the first portion P1 and the third portion P3.

The first plurality of gate/source pins 249A and the second plurality of gate/source pins 249B are configured to pop out vertically from the first power module substrate 280A and the second power module substrate 280B respectively.

Each of the plurality of semiconductor switches includes a plurality of dies $D_S$, and, while each of the plurality of semiconductor switches are illustrated as having three dies in parallel, it should be appreciated that the number of dies in each semiconductor switch can vary depending on the individual application requirements.

The positive DC power bus 210 and the negative DC power bus 212 are arranged at a first end 250-1 of the X-type multilevel power converter 250, while the first AC bus 221A, the second AC bus 222A, the third AC bus 221B, and the fourth AC bus 222B are arranged at a second end 250-2 of the X-type multilevel power converter 250.

The multilevel X-type power converter 250 may also include a cold plate (not shown) arranged between the third tier T3 and the fourth tier T4, as illustrated at 385 in FIG. 6.

As illustrated in FIGS. 6, 6A, and 6B, the plurality of semiconductor switches, the positive DC power bus 310, the negative DC power bus 312, the first AC bus 321A, the second AC bus 322A, the third AC bus 321B, the fourth AC bus 322B, the first clamping diode D1 371, and the second clamping diode D2 372 are arranged into a plurality of tiers.

The first tier T1 is composed of the first semiconductor switch S1 351 arranged coplanar with the second semiconductor switch S2 352 that is arranged coplanar with the first clamping diode D1 371 that is arranged coplanar with the fifth semiconductor switch S5 355 that is arranged coplanar with the sixth semiconductor switch S6 356 including a first tier T1, a second tier T2, a third tier T3, and a fourth tier T4.

The second tier T2 is composed of the positive DC power bus 310 arranged coplanar with the first conductive layer 347A that is arranged coplanar with the second conductive layer 348A that is arranged coplanar with the first AC bus 321A that is arranged coplanar with the second AC bus 322A.

The third tier T3 is composed of the negative DC power bus 312 arranged coplanar with the third conductive layer 347B that is arranged coplanar with the fourth conductive layer 348B that is arranged coplanar with the third AC bus 321B that is arranged coplanar with the fourth AC bus 322B.

The fourth tier T4 is composed of the third semiconductor switch S3 353 arranged coplanar with the fourth semiconductor switch S4 354 that is arranged coplanar with the second clamping diode D2 372 that are arranged coplanar with the seventh semiconductor switch S7 357 that is arranged coplanar with the eighth semiconductor switch S8 358.

The first tier T1 is arranged parallel to the second tier T2 that is arranged parallel to the third tier T3 that is arranged parallel to the fourth tier T4.

A cold plate 385 is arranged between the second tier T2 and the third tier T3.

The first conductive layer 347A and the second conductive layer 348A are adjoined to a first side 380A-1 of a first power module substrate 380A, and a first heat sink 342A is adjoined to a second side 380A-2 of the first power module substrate 380A. The second side 380A-2 being opposite the first side 380A-1.

The third conductive layer 347B and the fourth conductive layer 348B are adjoined to a first side 380B-1 of a second power module substrate 380B, and a second heat sink 342B is adjoined to a second side 380B-2 of the second power module substrate 380B. The second side 380B-2 being opposite the first side 380B-1.

As schematically illustrated in FIG. 6A, the fifth semiconductor switch S5 355 and the sixth semiconductor switch S6 356 are arranged on a first portion P1 of the first power module substrate 380A.

The first clamping diode D1 371 and a first plurality of gate/source pins 349A are arranged on a second portion P2 of the first power module substrate 380A.

The first semiconductor switch S1 351 and the second semiconductor switch S2 352 are arranged on a third portion P3 of the first power module substrate 380A.

The first portion P1, the second portion P2, and the third portion P3 of the first power module substrate 380A are coplanar, the second portion P2 being arranged between the first portion P1 and the third portion P3.

As schematically illustrated in FIG. 6B, the seventh semiconductor switch S7 357 and the eighth semiconductor switch S8 358 are arranged on a first portion P1 of the second power module substrate 380B.

The second clamping diode D2 372 and a second plurality of gate/source pins 349B are arranged on a second portion P2 of the second power module substrate 380B.

The third semiconductor switch S3 353 and the fourth semiconductor switch S4 354 are arranged on a third portion P3 of the second power module substrate 380B.

The first portion P1, the second portion P2, and the third portion P3 of the second power module substrate 380B are coplanar, the second portion P2 being arranged between the first portion P1 and the third portion P3.

The first plurality of gate/source pins 349A and the second plurality of gate/source pins 349B are configured to pop out vertically from the first power module substrate 380A and the second power module substrate 380B respectively.

Each of the plurality of semiconductor switches includes a plurality of dies $D_S$, and, while each of the plurality of semiconductor switches are illustrated as having three dies in parallel, it should be appreciated that the number of dies in each semiconductor switch can vary depending on the individual application requirements.

The positive DC power bus 310 and the negative DC power bus 312 are arranged at a first end 350-1 of the X-type multilevel power converter 350, while the first AC bus 321A, the second AC bus 322A, the third AC bus 321B, and the fourth AC bus 322B are arranged at a second end 350-2 of the X-type multilevel power converter 350.

Interconnections 351 extend between the first clamping diode D1 371 and the fourth conductive layer 348B and the second clamping diode D2 372, and between the second conductive layer 348A D1 372.

According to another aspect of the disclosure, as illustrated in FIGS. 7, 7A, and 7B with continued reference to FIG. 3, an X-type multilevel power converter 450 includes a plurality of semiconductor switches disposed in a laterally tiered arrangement on power module substrates 480A, 480B. The plurality of semiconductor switches includes, in one aspect of the disclosure and as shown, a first semiconductor switch S1 451, a second semiconductor switch S2 452, a third semiconductor switch S3 453, a fourth semiconductor switch S4 454, a fifth semiconductor switch S5 455, a sixth semiconductor switch S6 456, a seventh semiconductor switch S7 457, and an eighth semiconductor switch S8 458.

The plurality of semiconductor switches, the first clamping diode D1 471, and the second clamping diode D2 472 are interconnected by a plurality of interconnections on the power module substrates 480A, 480B.

The X-type multilevel power converter 450 includes a positive DC power bus 410, a negative DC power bus 412, a first alternating current (AC) bus 421A, a second AC bus 422A, a third AC bus 421B, a fourth AC bus 422B, a first clamping diode D1 471, a second clamping diode D2 472, a first power module substrate 480A, a second power module substrate 480B, a first heat sink 442A adjacent to a first side 480A-1 of the first power module substrate 480A, and a second heat sink 442B adjacent to a first side 480B-1 of the second power module substrate 480B.

A first conductive spacer 446A is arranged between the first clamping diode D1 471 and a second side 480A-2 of the first power module substrate 480A.

A second conductive spacer 446B is arranged between the second clamping diode D2 472 and a second side 480B-2 of the second power module substrate 480B.

The X-type multilevel power converter 450 includes a plurality of semiconductor switches including a first semiconductor switch S1 451, a second semiconductor switch S2 452, a third semiconductor switch S3 453, a fourth semiconductor switch S4 454, a fifth semiconductor switch S5 455, a sixth semiconductor switch S6 456, a seventh semiconductor switch S7 457, and an eighth semiconductor switch S8 458.

The first semiconductor switch S1 451, the second semiconductor switch S2 452, the third semiconductor switch S3 453, and the fourth semiconductor switch S4 454 are connected in series between the positive DC power bus 410 and the negative DC power bus 412.

The first semiconductor switch S1 451 is connected to the second semiconductor switch S2 452 at a first node 161. The second semiconductor switch S2 452 is connected to the third semiconductor switch S3 453 at a second node 162, and the third semiconductor switch S3 453 is connected to the fourth semiconductor switch S4 454 at a third node 163.

The fifth semiconductor switch S5 455, the sixth semiconductor switch S6 456, the seventh semiconductor switch S7 457, and the eighth semiconductor switch S8 458 is connected in series between the positive DC power bus 410 and the negative DC power bus 412.

The fifth semiconductor switch S5 455 is connected to the sixth semiconductor switch S6 456 at a fourth node 164. The sixth semiconductor switch S6 456 is connected to the seventh semiconductor switch S7 457 at a fifth node 165, and the seventh semiconductor switch S7 457 is connected to the eighth semiconductor switch S8 458 at a sixth node 166.

The first clamping diode D1 471 is connected between the third node 163 and the fourth node 164. The second clamping diode D2 472 is connected between the first node 161 and the sixth node 166.

The second node 162 is connected to the first AC power bus 421A and the fifth node 165 is connected to the second AC power bus 422A.

Each of the plurality of semiconductor switches may include a plurality of semiconductor dies $D_S$ that include a plurality of gate/source control terminals or pins 449A, 449B. While each semiconductor switch is illustrated as including three semiconductor dies $D_S$, it should be appreciated that each semiconductor switch could include more than three or less than three semiconductor dies $D_S$ based on the individual application requirements.

The plurality of semiconductor switches, the positive DC power bus 410, the negative DC power bus 412, the first AC bus 421A, the second AC bus 422A, the first clamping diode D1 471, and the second clamping diode D2 472 are arranged into a plurality of tiers including a first tier T1, a second tier T2, a third tier T3, a fourth tier T4, a fifth tier T5, and a sixth tier T6.

The first tier T1 is composed of the first conductive layer 447A arranged coplanar with the second conductive layer 448A.

The second tier T2 composed of the first semiconductor switch S1 451 arranged coplanar with the second semiconductor switch S2 452 that is arranged coplanar with at least two first clamping diodes D1 471 that are arranged coplanar with the fifth semiconductor switch S5 455 that is arranged coplanar with the sixth semiconductor switch S6 456.

The third tier T3 is composed of the positive DC power bus 410 arranged coplanar with the first AC bus 421A that is arranged coplanar with the second AC bus 422A.

The fourth tier T4 is composed of the negative DC power bus 412 arranged coplanar with the third AC bus 421B that is arranged coplanar with the fourth AC bus 422B.

The fifth tier T5 is composed of the third semiconductor switch S3 453 arranged coplanar with the fourth semiconductor switch S4 454 that is arranged coplanar with the at least two second clamping diodes D2 472 that are arranged coplanar with the seventh semiconductor switch S7 457 that is arranged coplanar with the eighth semiconductor switch S8 458.

The sixth tier T6 is composed of the third conductive layer 448B arranged coplanar with the fourth conductive layer 447B.

The first tier T1 is arranged parallel to the second tier T2 that is arranged parallel to the third tier T3 that is arranged parallel to the fourth tier T4 that is arranged parallel to the fifth tier T5 that is arranged parallel to the sixth tier T6.

Conductive spacers 446A are arranged between the fifth semiconductor switch S5 455, and the positive DC power bus 410, the first semiconductor switch S1 451 and the positive DC power bus 410, each of the at least two first clamping diodes D1 471 and the second power module substrate 480B, the sixth semiconductor switch S6 456 and the second AC bus 422A, and the second semiconductor switch S2 452 and the first AC bus 421A.

Conductive spacers 446B are arranged between the eighth semiconductor switch S8 458 and the negative DC power bus 412, the fourth semiconductor switch S4 454 and the negative DC power bus 412, each of the at least two second clamping diodes D2 472 and the first power module substrate 480A, the seventh semiconductor switch S7 457 and the third AC bus 421B, and the third semiconductor switch S3 453 and the fourth AC bus 422B.

The first semiconductor switch S1 451, the second semiconductor switch S2 452, the fifth semiconductor switch S5 455, and the sixth semiconductor switch S6 456 are adjoined to a first side 480A-1 of a first power module substrate 480A, and a first heat sink 442A is adjoined to a second side 480A-2 of the first power module substrate 480A. The second side 480A-2 being opposite the first side 480A-1.

The third semiconductor switch S3 453, the fourth semiconductor switch S4 454, the seventh semiconductor switch S7 457, and the eighth semiconductor switch S8 458 are adjoined to a first side 480B-1 of a second power module substrate 480B, and a second heat sink 442B is adjoined to a second side 480B-2 of the second power module substrate 480B. The second side 480B-2 being opposite the first side 480B-1.

Conductive spacers 546A, 546B extend between the first clamping diode D1 471 and the fourth conductive layer 548B, and the second clamping diode D2 472 and the second conductive layer 548A.

As schematically illustrated in FIG. 7A, the fifth semiconductor switch S5 455, the sixth semiconductor switch S6 456, and the at least two first clamping diodes D1 472 are arranged on a first portion P1 of the first power module substrate 480A.

A first plurality of gate/source pins 449A are arranged on a second portion P2 of the first power module substrate 480A.

The first semiconductor switch S1 451, the second semiconductor switch S2 452, and the at least two second clamping diodes D2 472 are arranged on a third portion P3 of the first power module substrate 480A.

The first portion P1, the second portion P2, and the third portion P3 of the first power module substrate 480A are coplanar, the second portion P2 being arranged between the first portion P1 and the third portion P3.

As schematically illustrated in FIG. 7B, the seventh semiconductor switch S7 457, the eighth semiconductor switch S8 458, and the at least two second clamping diodes D2 472 are arranged on a first portion P1 of the second power module substrate 480B.

A second plurality of gate/source pins 449B are arranged on a second portion P2 of the second power module substrate 480B.

The third semiconductor switch S3 453 and the fourth semiconductor switch S4 454 are arranged on a third portion P3 of the second power module substrate 480B.

The first portion P1, the second portion P2, and the third portion P3 of the second power module substrate 480B are coplanar, the second portion P2 being arranged between the first portion P1 and the third portion P3.

The first plurality of gate/source pins 449A and the second plurality of gate/source pins 449B are configured to pop out vertically from the first power module substrate 480A and the second power module substrate 480B respectively.

Each of the plurality of semiconductor switches includes a plurality of dies $D_S$, and, while each of the plurality of semiconductor switches are illustrated as having three dies in parallel, it should be appreciated that the number of dies in each semiconductor switch can vary depending on the individual application requirements.

The positive DC power bus 410 and the negative DC power bus 412 are arranged at a first end 450-1 of the X-type multilevel power converter 450, while the first AC bus 421A, the second AC bus 422A, the third AC bus 421B, and the fourth AC bus 422B are arranged at a second end 450-2 of the X-type multilevel power converter 450.

The multilevel X-type power converter 450 may also include a cold plate (not shown) arranged between the third tier T3 and the fourth tier T4, as illustrated at 385 in FIG. 6.

As illustrated in FIGS. 8, 8A, and 8B, the plurality of semiconductor switches, the positive DC power bus 510, the negative DC power bus 512, the first AC bus 521A, the second AC bus 522A, the at least two first clamping diodes D1 571, and the at least two second clamping diodes D2 572 are arranged into a plurality of tiers including a first tier T1, a second tier T2, a third tier T3, a fourth tier T4, and a fifth tier T5.

The first tier T1 is composed of the first semiconductor switch S1 551 arranged coplanar with the second semiconductor switch S2 552 that is arranged coplanar with the at least two first clamping diodes D1 571 that are arranged coplanar with the fifth semiconductor switch S5 555 that is arranged coplanar with the sixth semiconductor switch S6 556.

The second tier T2 is composed of the positive DC power bus 510 arranged coplanar with the first conductive layer 547A that is arranged coplanar with the second conductive layer 548A that is arranged coplanar with the first AC bus 521A that is arranged coplanar with the second AC bus 522A.

The third tier T3 is composed of the at least two first clamping diodes D1 571 arranged coplanar with the at least two second clamping diodes D2 572.

The fourth tier T4 is composed of the negative DC power bus 512 arranged coplanar with the third conductive layer 547B that is arranged coplanar with the fourth conductive layer 548B that is arranged coplanar with the third AC bus 521B that is arranged coplanar with the fourth AC bus 522B.

The fifth tier T5 is composed of the third semiconductor switch S3 553 arranged coplanar with fourth semiconductor switch S4 554 that is arranged coplanar with the at least two second clamping diodes D2 572 that are arranged coplanar with the seventh semiconductor switch S7 557 that is arranged coplanar with the eighth semiconductor switch S8 558.

The first tier T1 is arranged parallel to the second tier T2 that is arranged parallel to the third tier T3 that is arranged parallel to the fourth tier T4 that is arranged parallel to the fifth tier T5.

The first semiconductor switch S1 551, the second semiconductor switch S2 552, the fifth semiconductor switch S5 555, and the sixth semiconductor switch S6 556 are adjoined to a first side 580A-1 of a first power module substrate 580A, and a first heat sink 542A is adjoined to a second side 580A-2 of the first power module substrate 580A. The second side 580A-2 being opposite the first side 580A-1.

The third semiconductor switch S3 553, the fourth semiconductor switch S4 454, the seventh semiconductor switch S7 557, and the eighth semiconductor switch S8 558 are adjoined to a first side 580B-1 of a second power module substrate 580B, and a second heat sink 542B is adjoined to a second side 580B-2 of the second power module substrate 580B. The second side 580B-2 being opposite the first side 580B-1.

As schematically illustrated in FIG. 8A, the fifth semiconductor switch S5 555, the sixth semiconductor switch S6 556, and the at least two first clamping diodes D1 572 are arranged on a first portion P1 of the first power module substrate 580A.

A first plurality of gate/source pins 549A are arranged on a second portion P2 of the first power module substrate 580A.

The first semiconductor switch S1 551 and the second semiconductor switch S2 552 are arranged on a third portion P3 of the first power module substrate 580A.

The first portion P1, the second portion P2, and the third portion P3 of the first power module substrate 580A are coplanar, the second portion P2 being arranged between the first portion P1 and the third portion P3.

As schematically illustrated in FIG. 8B, the seventh semiconductor switch S7 557, the eighth semiconductor switch S8 558, and the at least two second clamping diodes D2 572 are arranged on a first portion P1 of the second power module substrate 580B.

A second plurality of gate/source pins 549B are arranged on a second portion P2 of the second power module substrate 580B.

The third semiconductor switch S3 553 and the fourth semiconductor switch S4 554 are arranged on a third portion P3 of the second power module substrate 580B.

The first portion P1, the second portion P2, and the third portion P3 of the second power module substrate 580B are coplanar, the second portion P2 being arranged between the first portion P1 and the third portion P3.

The first plurality of gate/source pins 549A and the second plurality of gate/source pins 549B are configured to pop out vertically from the first power module substrate 580A and the second power module substrate 580B respectively.

Each of the plurality of semiconductor switches includes a plurality of dies $D_S$, and, while each of the plurality of semiconductor switches are illustrated as having three dies in parallel, it should be appreciated that the number of dies in each semiconductor switch can vary depending on the individual application requirements.

The positive DC power bus 510 and the negative DC power bus 512 are arranged at a first end 550-1 of the X-type multilevel power converter 550, while the first AC bus 521A, the second AC bus 522A, the third AC bus 512B, and the fourth AC bus 522B are arranged at a second end 550-2 of the X-type multilevel power converter 550.

The multilevel X-type power converter 550 may also include a cold plate (not shown) arranged between the second tier T2 and the third tier T3, as illustrated at 385 in FIG. 6.

As illustrated in FIGS. 9, 9A, and B, the plurality of semiconductor switches, the positive DC power bus 610, the negative DC power bus 512, the first AC bus 621A, the second AC bus 622A, the at least two first clamping diodes D1 671, and the at least two second clamping diodes D2 672 are arranged into a plurality of tiers including a first tier T1, a second tier T2, a third tier T3, and a fourth tier T4.

The first tier T1 is composed of the positive DC power bus 610 arranged coplanar with the first conductive layer 647A that is arranged coplanar with the second conductive layer 648A that is arranged coplanar with the first AC bus 621A that is arranged coplanar with the second AC bus 622A.

The second tier T2 is composed of the first semiconductor switch S1 651 arranged coplanar with the second semiconductor switch S2 652 that is arranged coplanar with the at least two first clamping diodes D1 671 that are arranged coplanar with the fifth semiconductor switch S5 655 that is arranged coplanar with the sixth semiconductor switch S6 556.

The third tier T3 is composed of the third semiconductor switch S3 653 arranged coplanar with fourth semiconductor switch S4 654 that is arranged coplanar with the at least two second clamping diodes D2 672 that are arranged coplanar with the seventh semiconductor switch S7 657 that is arranged coplanar with the eighth semiconductor switch S8 658.

The fourth tier T4 is composed of the negative DC power bus 612 arranged coplanar with the third conductive layer 647B that is arranged coplanar with the fourth conductive layer 648B that is arranged coplanar with the third AC bus 621B that is arranged coplanar with the fourth AC bus 622B.

The first tier T1 is arranged parallel to the second tier T2 that is arranged parallel to the third tier T3 that is arranged parallel to the fourth tier T4.

Conductive spacers 646A are arranged between the at least two first clamping diodes D1 671 and the third conductive layer 647B.

Conductive spacers 646B are arranged between the at least two second clamping diodes D2 672 and the second conductive layer 648A.

The first semiconductor switch S1 651, the second semiconductor switch S2 652, the fifth semiconductor switch S5 655, and the sixth semiconductor switch S6 656 are adjoined to a first side 680A-1 of a first power module substrate 680A, and a first heat sink 642A is adjoined to a second side 680A-2 of the first power module substrate 680A. The second side 680A-2 being opposite the first side 680A-1.

The third semiconductor switch S3 653, the fourth semiconductor switch S4 654, the seventh semiconductor switch S7 657, and the eighth semiconductor switch S8 658 are adjoined to a first side 680B-1 of a second power module substrate 680B, and a second heat sink 642B is adjoined to a second side 680B-2 of the second power module substrate 680B. The second side 680B-2 being opposite the first side 680B-1.

As schematically illustrated in FIG. 9A, the fifth semiconductor switch S5 655, the sixth semiconductor switch S6 656, and the at least two first clamping diodes D1 672 are arranged on a first portion P1 of the first power module substrate 680A.

A first plurality of gate/source pins 649A are arranged on a second portion P2 of the first power module substrate 680A.

The first semiconductor switch S1 651 and the second semiconductor switch S2 652 are arranged on a third portion P3 of the first power module substrate 680A.

The first portion P1, the second portion P2, and the third portion P3 of the first power module substrate 680A are coplanar, the second portion P2 being arranged between the first portion P1 and the third portion P3.

As schematically illustrated in FIG. 9B, the seventh semiconductor switch S7 677, the eighth semiconductor switch S8 658, and the at least two second clamping diodes D2 672 are arranged on a first portion P1 of the second power module substrate 680B.

A second plurality of gate/source pins 649B are arranged on a second portion P2 of the second power module substrate 680B.

The third semiconductor switch S3 653 and the fourth semiconductor switch S4 654 are arranged on a third portion P3 of the second power module substrate 680B.

The first portion P1, the second portion P2, and the third portion P3 of the second power module substrate 680B are coplanar, the second portion P2 being arranged between the first portion P1 and the third portion P3.

The first plurality of gate/source pins 649A and the second plurality of gate/source pins 649B are configured to pop out vertically from the first power module substrate 680A and the second power module substrate 680B respectively.

Each of the plurality of semiconductor switches includes a plurality of dies $D_S$, and, while each of the plurality of semiconductor switches are illustrated as having three dies in parallel, it should be appreciated that the number of dies in each semiconductor switch can vary depending on the individual application requirements.

The positive DC power bus 610 and the negative DC power bus 612 are arranged at a first end 650-1 of the X-type multilevel power converter 650, while the first AC bus 621A, the second AC bus 622A, the third AC bus 621B, and the fourth AC bus 622B are arranged at a second end 650-2 of the X-type multilevel power converter 650.

The multilevel X-type power converter 650 may also include a cold plate (not shown) arranged between the second tier T2 and the third tier T3, as illustrated at 385 in FIG. 6.

According to another aspect of the disclosure, as illustrated in FIGS. 10, 10A, and 10B with continued reference to FIG. 3, an X-type multilevel power converter 750 includes a plurality of semiconductor switches disposed in a laterally tiered arrangement on power module substrates 780A, 780B. The plurality of semiconductor switches includes, in one aspect of the disclosure and as shown, a first semiconductor switch S1 751, a second semiconductor switch S2 752, a third semiconductor switch S3 753, a fourth semiconductor switch S4 754, a fifth semiconductor switch S5 755, a sixth semiconductor switch S6 756, a seventh semiconductor switch S7 757, and an eighth semiconductor switch S8 758.

The plurality of semiconductor switches, the first clamping diode D1 771, and the second clamping diode D2 772 are interconnected by a plurality of interconnections on the power module substrates 780A, 780B.

The X-type multilevel power converter 750 includes a first positive DC power bus 710A, a second positive DC bus 710B, a first negative DC power bus 712A, a second negative DC power bus 712B, a first alternating current (AC) bus 721, a second AC power bus 722, a first clamping diode D1 771, a second clamping diode D2 772, a first power module substrate 780A, a second power module substrate 780B, a first heat sink 742A adjacent to a first side 780A-1 of the first power module substrate 780A, and a second heat sink 742B adjacent to a first side 780B-1 of the second power module substrate 780B.

The X-type multilevel power converter 750 includes a plurality of semiconductor switches including a first semiconductor switch S1 751, a second semiconductor switch S2 752, a third semiconductor switch S3 753, a fourth semiconductor switch S4 754, a fifth semiconductor switch S5 755, a sixth semiconductor switch S6 756, a seventh semiconductor switch S7 757, and an eighth semiconductor switch S8 758.

The first semiconductor switch S1 751, the second semiconductor switch S2 752, the third semiconductor switch S3 753, and the fourth semiconductor switch S4 754 are connected in series between the positive DC power bus 710 and the negative DC power bus 712.

The first semiconductor switch S1 751 is connected to the second semiconductor switch S2 752 at a first node 161. The second semiconductor switch S2 752 is connected to the third semiconductor switch S3 753 at a second node 162, and the third semiconductor switch S3 753 is connected to the fourth semiconductor switch S4 454 at a third node 163.

The fifth semiconductor switch S5 755, the sixth semiconductor switch S6 756, the seventh semiconductor switch S7 757, and the eighth semiconductor switch S8 758 is connected in series between the positive DC power bus 710 and the negative DC power bus 712.

The fifth semiconductor switch S5 755 is connected to the sixth semiconductor switch S6 756 at a fourth node 164. The sixth semiconductor switch S6 756 is connected to the seventh semiconductor switch S7 757 at a fifth node 165, and the seventh semiconductor switch S7 757 is connected to the eighth semiconductor switch S8 758 at a sixth node 166.

The first clamping diode D1 771 is connected between the third node 163 and the fourth node 164. The second clamping diode D2 772 is connected between the first node 161 and the sixth node 166.

The second node 162 is connected to the first AC power bus 721 and the fifth node 165 is connected to the second AC power bus 722.

Each of the plurality of semiconductor switches may include a plurality of semiconductor dies $D_S$ that include a plurality of gate/source control terminals or pins 749A, 749B. While each semiconductor switch is illustrated as including three semiconductor dies $D_S$, it should be appreciated that each semiconductor switch could include more than three or less than three semiconductor dies $D_S$ based on the individual application requirements.

The plurality of semiconductor switches, the positive DC power bus 710, the negative DC power bus 712, the first AC bus 721, the second AC bus 722, the first clamping diode D1 771, and the second clamping diode D2 772 are arranged into a plurality of tiers.

A first tier T1 is composed of the fifth semiconductor switch S5 755 arranged coplanar with the sixth semiconductor switch S6 756 that is arranged coplanar with the seventh semiconductor switch S7 757 that is arranged coplanar with the eighth semiconductor switch S8 758.

A second tier T2 is composed of the first positive DC power 710A arranged coplanar with the first negative DC power bus 712A that is arranged coplanar with the first conductive layer 747A that is arranged coplanar with the second conductive layer 748A that is arranged coplanar with the first AC bus 721.

A third tier T3 is composed of the first clamping diode D1 771 arranged coplanar with the second clamping diode D2 772.

A fourth tier T4 is composed of the second positive DC power bus 710B arranged coplanar with the second negative DC power bus 712B that is arranged coplanar with the third conductive layer 747B that is arranged coplanar with the fourth conductive layer 748B that is arranged coplanar with the second AC bus 722.

A fifth tier T5 is composed of the first semiconductor switch S1 751 arranged coplanar with the second semiconductor switch S2 752 that is arranged coplanar with the third semiconductor switch S3 753 that is arranged coplanar with the fourth semiconductor switch S4 754.

The first tier T1 is arranged parallel to the second tier T2 that is arranged parallel to the third tier T3 that is arranged parallel to the fourth tier T4 that is arranged parallel to the fifth tier T5.

The fifth semiconductor switch S5 755, the sixth semiconductor switch S6 756, the seventh semiconductor switch S7 757, and the eighth semiconductor switch S8 758 are adjoined to a first side 780A-1 of a first power module substrate 780A, and a first heat sink 742A is adjoined to a second side 780A-2 of the first power module substrate 780A. The second side 780A-2 being opposite the first side 780A-1.

The first semiconductor switch S1 751, the second semiconductor switch S2 752, the third semiconductor switch S3 753, and the fourth semiconductor switch S4 754 are adjoined to a first side 780B-1 of a second power module substrate 780B, and a second heat sink 742B is adjoined to a second side 780B-2 of the second power module substrate 780B. The second side 780B-2 being opposite the first side 780B-1.

As schematically illustrated in FIG. 10A, the fifth semiconductor switch S5 755 and the sixth semiconductor switch S6 756 are arranged on a first portion P1 of the first power module substrate 780A.

The first clamping diode D1 771 and a first plurality of gate/source pins 749A are arranged on a second portion P2 of the first power module substrate 780A.

The eighth semiconductor switch S8 758 and the seventh semiconductor switch S7 757 are arranged on a third portion P3 of the first power module substrate 780A.

The first portion P1, the second portion P2, and the third portion P3 of the first power module substrate 780A are coplanar, the second portion P2 being arranged between the first portion P1 and the third portion P3.

As schematically illustrated in FIG. 10B, the first semiconductor switch S1 751 and the second semiconductor switch S2 752 are arranged on a first portion P1 of the second power module substrate 780B.

The second clamping diode D2 772 and a second plurality of gate/source pins 749B are arranged on a second portion P2 of the second power module substrate 780B.

The third semiconductor switch S3 753 and the fourth semiconductor switch S4 754 are arranged on a third portion P3 of the second power module substrate 780B.

The first portion P1, the second portion P2, and the third portion P3 of the second power module substrate 780B are coplanar, the second portion P2 being arranged between the first portion P1 and the third portion P3.

The first plurality of gate/source pins 749A and the second plurality of gate/source pins 749B are configured to pop out vertically from the first power module substrate 780A and the second power module substrate 780B respectively.

Each of the plurality of semiconductor switches includes a plurality of dies $D_S$, and, while each of the plurality of semiconductor switches are illustrated as having three dies in parallel, it should be appreciated that the number of dies in each semiconductor switch can vary depending on the individual application requirements.

The first positive DC power bus 710A, the second positive DC power bus 710B, the first negative DC power bus 712A, and the second negative DC power bus 712B are arranged at a first end 750-1 of the X-type multilevel power converter 750, while the first AC bus 721, the second AC bus 722 are arranged at a second end 750-2 of the X-type multilevel power converter 750.

The multilevel X-type power converter 750 may also include a cold plate (not shown) arranged between the second tier T2 and the third tier T3, as illustrated at 385 in FIG. 6.

According to one aspect of the disclosure, as illustrated in FIGS. 11, 11A, and 11B, the plurality of semiconductor switches, the first positive DC power bus 810A, the second positive DC bus 810B, the first negative DC power bus 812A, the second negative DC power bus 812B, the first AC bus 821, the second AC bus 822, the first clamping diode D1 871, and the second clamping diode D2 872 are arranged into a plurality of tiers including a first tier T1, a second tier T2, a third tier T3, a fourth tier T4, a fifth tier T5, and a sixth tier T6.

The first tier T1 is composed of the first conductive layer 847A arranged coplanar with the second coplanar layer 848A.

The second tier T2 is composed of the fifth semiconductor switch S5 855 arranged coplanar with the sixth semiconductor switch S6 856 that is arranged coplanar with the first clamping diode D1 871 that is arranged coplanar with the second clamping diode D2 872 that is arranged coplanar with the seventh semiconductor switch S7 857 that is arranged coplanar with the eighth semiconductor switch S8 858.

The third tier T3 is composed of the first positive DC power 810A arranged coplanar with the first negative DC power bus 812A that is arranged coplanar with the first AC bus 821.

The fourth tier T4 is composed of the second positive DC power bus 810B arranged coplanar with the second negative DC power bus 812B that is arranged coplanar with the second AC bus 822.

The fifth tier T5 is composed of the first semiconductor switch S1 851 arranged coplanar with the second semiconductor switch S2 852 that is arranged coplanar with the second clamping diode D2 872 that is arranged coplanar with the third semiconductor switch S3 853 that is arranged coplanar with the fourth semiconductor switch S4 854.

The sixth tier T6 is composed of the third conductive layer 847B arranged coplanar with the fourth conductive layer 848B.

The first tier T1 is arranged parallel to the second tier T2 that is arranged parallel to the third tier T3 that is arranged parallel to the fourth tier T4 that is arranged parallel to the fifth tier T5 that is arranged parallel to the sixth tier T6.

Conductive spacers 846A are arranged between the first clamping diode D1 871 and the second power module substrate 880B, the sixth semiconductor switch S6 856 and the first AC bus 821, and the fifth semiconductor switch S5 855 and the first positive DC bus 810A.

Conductive spacers 846B are arranged between the second clamping diode D2 872 and the first power module substrate 880A, the third semiconductor switch S3 853 and the second AC bus 822, and the fourth semiconductor switch S4 854 and the second negative DC power bus 812B.

The fifth semiconductor switch S5 855, the sixth semiconductor switch S6 856, the seventh semiconductor switch S7 857, and the eighth semiconductor switch S8 858 are adjoined to a first side 880A-1 of a first power module substrate 880A, and a first heat sink 842A is adjoined to a second side 880A-2 of the first power module substrate 880A. The second side 880A-2 being opposite the first side 880A-1.

The first semiconductor switch S1 851, the second semiconductor switch S2 852, the third semiconductor switch S3 853, and the fourth semiconductor switch S4 854 are adjoined to a first side 880B-1 of a second power module substrate 880B, and a second heat sink 842B is adjoined to a second side 880B-2 of the second power module substrate 880B. The second side 880B-2 being opposite the first side 880B-1.

As schematically illustrated in FIG. 11A, the fifth semiconductor switch S5 855 and the sixth semiconductor switch S6 856 are arranged on a first portion P1 of the first power module substrate 880A.

The first clamping diode D1 871 and a first plurality of gate/source pins 849A are arranged on a second portion P2 of the first power module substrate 880A.

The eighth semiconductor switch S8 858 and the seventh semiconductor switch S7 857 are arranged on a third portion P3 of the first power module substrate 880A.

The first portion P1, the second portion P2, and the third portion P3 of the first power module substrate 880A are coplanar, the second portion P2 being arranged between the first portion P1 and the third portion P3.

As schematically illustrated in FIG. 11B, the first semiconductor switch S1 871 and the second semiconductor switch S2 852 are arranged on a first portion P1 of the second power module substrate 880B.

The second clamping diode D2 872 and a second plurality of gate/source pins 849B are arranged on a second portion P2 of the second power module substrate 880B.

The third semiconductor switch S3 853 and the fourth semiconductor switch S4 854 are arranged on a third portion P3 of the second power module substrate 880B.

The first portion P1, the second portion P2, and the third portion P3 of the second power module substrate 880B are coplanar, the second portion P2 being arranged between the first portion P1 and the third portion P3.

The first plurality of gate/source pins 849A and the second plurality of gate/source pins 849B are configured to pop out vertically from the first power module substrate 880A and the second power module substrate 880B respectively.

Each of the plurality of semiconductor switches includes a plurality of dies $D_S$, and, while each of the plurality of semiconductor switches are illustrated as having three dies in parallel, it should be appreciated that the number of dies in each semiconductor switch can vary depending on the individual application requirements.

The first positive DC power bus 810A, the second positive DC power bus 810B, the first negative DC power bus 812A, and the second negative DC power bus 812B are arranged at a first end 850-1 of the X-type multilevel power converter 850, while the first AC bus 821, the second AC bus 822 are arranged at a second end 850-2 of the X-type multilevel power converter 850.

The multilevel X-type power converter 850 may also include a cold plate (not shown) arranged between the second tier T2 and the third tier T3, as illustrated at 385 in FIG. 6.

According to one aspect of the disclosure, as illustrated in FIGS. 12, 12A, and 12B, the plurality of semiconductor switches, the first positive DC power bus 910A, the second positive DC bus 910B, the first negative DC power bus 912A, the second negative DC power bus 912B, the first AC bus 921, the second AC bus 922, the first clamping diode D1

971, and the second clamping diode D2 972 are arranged into a plurality of tiers including a first tier T1, a second tier T2, a third tier T3, and a fourth tier T4.

The first tier T1 is composed of the first positive DC power bus 910A arranged coplanar with the first negative DC power bus 912A that is arranged coplanar with the first conductive layer 947A that is arranged coplanar with the second coplanar layer 948A that is arranged coplanar with the first AC bus 921.

The second tier T2 is composed of the fifth semiconductor switch S5 955 arranged coplanar with the sixth semiconductor switch S6 956 that is arranged coplanar with the first clamping diode D1 971 that is arranged coplanar with the second clamping diode D2 972 that is arranged coplanar with the seventh semiconductor switch S7 957 that is arranged coplanar with the eighth semiconductor switch S8 958.

The third tier T3 is composed of the first semiconductor switch S1 951 arranged coplanar with the second semiconductor switch S2 952 that is arranged coplanar with the second clamping diode D2 972 that is arranged coplanar with the third semiconductor switch S3 953 that is arranged coplanar with the fourth semiconductor switch S4 954.

The fourth tier T4 is composed of the second positive DC power bus 910B arranged coplanar with the second negative DC power bus 912B that is arranged coplanar with the third conductive layer 947B that is arranged coplanar with the fourth conductive layer 948B that is arranged coplanar with the second AC bus 922.

The first tier T1 is arranged parallel to the second tier T2 that is arranged parallel to the third tier T3 that is arranged parallel to the fourth tier T4.

Conductive spacer 946A is arranged between the first clamping diode D1 971 and the second power module substrate 980B.

Conductive spacer 946B is arranged between the second clamping diode D2 972 and the first power module substrate 980A.

The fifth semiconductor switch S5 955, the sixth semiconductor switch S6 956, the seventh semiconductor switch S7 957, and the eighth semiconductor switch S8 958 are adjoined to a first side 980A-1 of a first power module substrate 980A, and a first heat sink 942A is adjoined to a second side 980A-2 of the first power module substrate 980A. The second side 980A-2 being opposite the first side 980A-1.

The first semiconductor switch S1 951, the second semiconductor switch S2 952, the third semiconductor switch S3 953, and the fourth semiconductor switch S4 954 are adjoined to a first side 980B-1 of a second power module substrate 980B, and a second heat sink 942B is adjoined to a second side 980B-2 of the second power module substrate 980B. The second side 980B-2 being opposite the first side 980B-1.

As schematically illustrated in FIG. 12A, the fifth semiconductor switch S5 955 and the sixth semiconductor switch S6 956 are arranged on a first portion P1 of the first power module substrate 980A.

The first clamping diode D1 971 and a first plurality of gate/source pins 949A are arranged on a second portion P2 of the first power module substrate 980A.

The eighth semiconductor switch S8 958 and the seventh semiconductor switch S7 957 are arranged on a third portion P3 of the first power module substrate 980A.

The first portion P1, the second portion P2, and the third portion P3 of the first power module substrate 980A are coplanar, the second portion P2 being arranged between the first portion P1 and the third portion P3.

As schematically illustrated in FIG. 12B, the first semiconductor switch S1 971 and the second semiconductor switch S2 952 are arranged on a first portion P1 of the second power module substrate 980B.

The second clamping diode D2 972 and a second plurality of gate/source pins 949B are arranged on a second portion P2 of the second power module substrate 980B.

The third semiconductor switch S3 953 and the fourth semiconductor switch S4 954 are arranged on a third portion P3 of the second power module substrate 980B.

The first portion P1, the second portion P2, and the third portion P3 of the second power module substrate 980B are coplanar, the second portion P2 being arranged between the first portion P1 and the third portion P3.

The first plurality of gate/source pins 949A and the second plurality of gate/source pins 949B are configured to pop out vertically from the first power module substrate 980A and the second power module substrate 980B respectively.

Each of the plurality of semiconductor switches includes a plurality of dies $D_S$, and, while each of the plurality of semiconductor switches are illustrated as having three dies in parallel, it should be appreciated that the number of dies in each semiconductor switch can vary depending on the individual application requirements.

The first positive DC power bus 910A, the second positive DC power bus 910B, the first negative DC power bus 912A, and the second negative DC power bus 912B are arranged at a first end 950-1 of the X-type multilevel power converter 950, while the first AC bus 921, the second AC bus 922 are arranged at a second end 950-2 of the X-type multilevel power converter 950.

The multilevel X-type power converter 950 may also include a cold plate (not shown) arranged between the second tier T2 and the third tier T3, as illustrated at 385 in FIG. 6.

By configuring the topology within each of the X-type multilevel converters as illustrated above, both the positive DC power bus and the negative DC power bus are parallel with the auxiliary or neutral bus generating mutual inductance cancellation that minimizes parasitic inductance by coupling positive mutual inductance and negative mutual inductance for commutation loop currents within each of the X-type multilevel converters.

Further, including clamping diodes internal to the X-type multilevel converter also reduces the commutation loop within the X-type multilevel converter.

The concepts and aspects of the disclosure described herein facilitate various heat transfer and cooling systems, including direct cooling, indirect cooling, immersive cooling, single-sided or double-sided cooling.

These and other attendant benefits of the present disclosure will be appreciated by those skilled in the art in view of the foregoing disclosure.

The detailed description and the drawings or figures are supportive and descriptive of the present teachings, but the scope of the present teachings is defined solely by the claims. While some of the best modes and other examples for carrying out the present teachings have been described in detail, various alternative designs and aspects of the disclosure exist for practicing the present teachings defined in the appended claims.

What is claimed is:

1. A multi-phase power inverter for an electric propulsion system, the multi-phase power inverter comprising:

a plurality of X-type multilevel power converters arranged to transfer electric power between a high-voltage direct current (DC) power supply and an electric machine, wherein each of the plurality of X-type multilevel power converters is a solid-state integrated circuit (IC) including:

a positive DC power bus;

a negative DC power bus;

a neutral bus;

a first alternating current (AC) bus;

a second AC bus;

a third AC bus;

a fourth AC bus;

a first conductive layer;

a second conductive layer;

a third conductive layer;

a fourth conductive layer;

a plurality of semiconductor switches including a first semiconductor switch, a second semiconductor switch, a third semiconductor switch, a fourth semiconductor switch, a fifth semiconductor switch, a sixth semiconductor switch, a seventh semiconductor switch, and an eighth semiconductor switch; and a first clamping diode, and a second clamping diode; and a first conductive spacer arranged between the first clamping diode and a second power module substrate;

a second conductive spacer arranged between the second clamping diode and a first power module substrate; and wherein the first semiconductor switch, the second semiconductor switch, the third semiconductor switch, and the fourth semiconductor switch are connected in series between the positive DC power bus and the negative DC power bus;

wherein the fifth semiconductor switch, the sixth semiconductor switch, the seventh semiconductor switch, and the eighth semiconductor switch are connected in series between the positive DC power bus and the negative DC power bus;

wherein the first semiconductor switch is connected to the second semiconductor switch at a first node, wherein the second semiconductor switch is connected to the third semiconductor switch at a second node, and wherein the third semiconductor switch is connected to the fourth semiconductor switch at a third node;

wherein the fifth semiconductor switch is connected to the sixth semiconductor switch at a fourth node, wherein the sixth semiconductor switch is connected to the seventh semiconductor switch at a fifth node, and wherein the seventh semiconductor switch is connected to the eighth semiconductor switch at a sixth node;

wherein the first clamping diode is connected between the third node and the fourth node;

wherein the second clamping diode is connected between the first node and the sixth node;

wherein the second node is connected to the first AC bus;

wherein the fifth node is connected to the second AC bus; and wherein the plurality of semiconductor switches, the positive DC power bus, the negative DC power bus, the first AC bus, the second AC Bus, the third AC bus, the fourth AC bus, the first clamping diode, and the second clamping diode are arranged into a plurality of tiers including:

a first tier composed of the first semiconductor switch arranged coplanar with the second semiconductor switch that is arranged coplanar with first clamping diode that is arranged coplanar with the fifth semiconductor switch that is arranged coplanar with the sixth semiconductor switch;

a second tier composed of the positive DC power bus arranged coplanar with the first conductive layer that is arranged coplanar with the second conductive layer the first AC bus that is arranged coplanar with the second AC bus;

a third tier composed of the negative DC power bus arranged coplanar with the third conductive layer that is arranged coplanar with the fourth conductive layer that is arranged coplanar with the third AC bus that is arranged coplanar with the fourth AC bus; and a fourth tier composed of the third semiconductor switch arranged coplanar with the fourth coplanar switch that is arranged coplanar with the second clamping diode that is arranged coplanar with the seventh semiconductor switch that is arranged coplanar with the eighth semiconductor switch, wherein the first tier is arranged parallel to the second tier that is arranged parallel to the third tier that is arranged parallel to the fourth tier.

2. The multi-phase power inverter as recited in claim 1, further including:

a first heat sink; and a second heat sink;

a first power module substrate; and a second power module substrate; and wherein the first semiconductor switch, the second semiconductor switch, the fifth semiconductor switch, and the sixth semiconductor switch are adjoined to a first side of the first power module substrate, and the first heat sink is adjoined to a second side of the first power module substrate; and wherein the third semiconductor switch, the fourth semiconductor switch, the seventh semiconductor switch, and the eighth semiconductor switch are adjoined to a first side of the second power module substrate, and the second heat sink is adjoined to the second side of the second power module substrate.

3. The multi-phase power inverter as recited in claim 2, wherein the fifth semiconductor switch and the sixth semiconductor switch are arranged on a first portion of the first power module substrate;

wherein the first clamping diode, and a first plurality of gate/source pins are arranged on a second portion of the first power module substrate;

wherein the first semiconductor switch and the second semiconductor switch are arranged on a third portion of the first power module substrate;

wherein the first portion, the second portion, and the third portion of the first power module substrate are coplanar, the second portion being arranged between the first portion and the third portion;

wherein the seventh semiconductor switch and the eighth semiconductor switch are arranged on a first portion of the second power module substrate;

wherein the second clamping diode is arranged on a second portion of the second power module substrate;

wherein the third semiconductor switch and the fourth semiconductor switch are arranged on a third portion of the second power module substrate; and wherein the first portion, the second portion, and the third portion of the second power module substrate are coplanar, the second portion being arranged between the first portion and the third portion.

4. The multi-phase power inverter as recited in claim 3, wherein the first plurality of gate/source pins and the second plurality of gate/source pins are configured to pop out vertically from the first power module substrate and the second power module substrate respectively.

5. The multi-phase power inverter as recited in claim 4, wherein the positive DC power bus and the negative DC power bus are arranged at a first end of the X-type multilevel power converter, and wherein the first AC bus, the second AC bus, the third AC bus, and the fourth AC bus are arranged at a second end of the X-type multilevel power converter.

6. The multi-phase power inverter as recited in claim 1, wherein each of the plurality of semiconductor switches includes a plurality of dies.

7. The multi-phase power inverter as recited in claim 1, further including a cold plate arranged between the second tier and the third tier of the multi-phase inverter.

8. A multi-phase power inverter for an electric propulsion system, the multi-phase power inverter comprising:
- a plurality of X-type multilevel power converters arranged to transfer electric power between a high-voltage direct current (DC) power supply and an electric machine, wherein each of the plurality of X-type multilevel power converters is a solid-state integrated circuit (IC) including:
  - a positive DC power bus;
  - a negative DC power bus;
  - a neutral bus;
  - a first alternating current (AC) bus;
  - a second AC bus;
  - a third AC bus;
  - a fourth AC bus;
  - a first conductive layer;
  - a second conductive layer;
  - a third conductive layer;
  - a fourth conductive layer;
  - a plurality of semiconductor switches including a first semiconductor switch, a second semiconductor switch, a third semiconductor switch, a fourth semiconductor switch, a fifth semiconductor switch, a sixth semiconductor switch, a seventh semiconductor switch, and an eighth semiconductor switch; and
  - at least two first clamping diodes, and at least two second clamping diodes; and
- wherein the first semiconductor switch, the second semiconductor switch, the third semiconductor switch, and the fourth semiconductor switch are connected in series between the positive DC power bus and the negative DC power bus;
- wherein the fifth semiconductor switch, the sixth semiconductor switch, the seventh semiconductor switch, and the eighth semiconductor switch are connected in series between the positive DC power bus and the negative DC power bus;
- wherein the first semiconductor switch is connected to the second semiconductor switch at a first node, wherein the second semiconductor switch is connected to the third semiconductor switch at a second node, and wherein the third semiconductor switch is connected to the fourth semiconductor switch at a third node;
- wherein the fifth semiconductor switch is connected to the sixth semiconductor switch at a fourth node, wherein the sixth semiconductor switch is connected to the seventh semiconductor switch at a fifth node, and wherein the seventh semiconductor switch is connected to the eighth semiconductor switch at a sixth node;
- wherein the first clamping diode is connected between the third node and the fourth node;
- wherein the second clamping diode is connected between the first node and the sixth node;
- wherein the second node is connected to the first AC bus;
- wherein the fifth node is connected to the second AC bus;
- wherein the plurality of semiconductor switches, the positive DC power bus, the negative DC power bus, the first AC bus, the at least two first clamping diodes, and the at least two second clamping diodes are arranged into a plurality of tiers including:
  - a first tier composed of the first conductive layer arranged coplanar with the second conductive layer;
  - a second tier composed of the first semiconductor switch arranged coplanar with the second that is arranged coplanar with at least two first clamping diodes that are arranged coplanar with the fifth semiconductor switch that is arranged coplanar with the sixth semiconductor switch;
  - a third tier composed of the positive DC power bus arranged coplanar with the first AC bus that is arranged coplanar with the second AC bus;
  - a fourth tier composed of the negative DC power bus arranged coplanar with the third AC bus that is arranged coplanar with the fourth AC bus;
  - a fifth tier composed of the third semiconductor switch arranged coplanar with the fourth semiconductor switch that is arranged coplanar with the at least two second clamping diodes that are arranged coplanar with the seventh semiconductor switch that is arranged coplanar with the eighth semiconductor switch;
  - a sixth tier composed of the third conductive layer arranged coplanar with the fourth conductive layer, wherein the first tier is arranged parallel to the second tier that is arranged parallel to the third tier that is arranged parallel to the fourth tier that is arranged parallel to the fifth that is arranged parallel to the sixth tier; and
- wherein conductive spacers are arranged between the fifth semiconductor switch and the positive DC power bus, the first semiconductor switch and the positive DC power bus, each of the at least two first clamping diodes and a second power module substrate, the sixth semiconductor switch and the second AC bus, and the second semiconductor switch and the first AC bus; and
- wherein conductive spacers are arranged between the eighth semiconductor switch and the negative DC power bus, the fourth semiconductor switch and the negative DC power bus, each of the at least two second clamping diodes and a first power module substrate, the seventh semiconductor switch and the third AC bus, and the third semiconductor switch and the fourth AC bus.

9. The multi-phase power inverter as recited in claim 8, further including:
- a first heat sink;
- a second heat sink;
- a first power module substrate; and
- a second power module substrate; and
- wherein the first semiconductor switch, the second semiconductor switch, the fifth semiconductor switch, and the sixth semiconductor switch are adjoined to a first side of the first power module substrate, and the first heat sink is adjoined to a second side of the first power module substrate; and wherein the third semiconductor switch, the fourth semiconductor switch, the seventh semiconductor switch, and the eighth semiconductor switch are adjoined to a first side of the second power module substrate, and the second heat sink is adjoined to the second side of the second power module substrate.

10. The multi-phase power inverter as recited in claim 9, wherein the fifth semiconductor switch, the sixth semiconductor switch, and the at least two first clamping diodes are arranged on a first portion of the first power module substrate;

wherein a first plurality of gate/source pins are arranged on a second portion of the first power module substrate;

wherein the first semiconductor switch, the second semiconductor switch, and the at least two second clamping diodes are arranged on a third portion of the first power module substrate;

wherein the first portion, the second portion, and the third portion of the first power module substrate are coplanar, the second portion being arranged between the first portion and the third portion;

wherein the seventh semiconductor switch, the eighth semiconductor switch, and the at least two second clamping diodes are arranged on a first portion of the second power module substrate;

wherein a second plurality of gate/source pins are arranged on a second portion of the second power module substrate;

wherein the third semiconductor switch and the fourth semiconductor switch are arranged on a third portion of the second power module substrate; and wherein the first portion, the second portion, and the third portion of the second power module substrate are coplanar, the second portion being arranged between the first portion and the third portion.

11. The multi-phase power inverter as recited in claim 10, wherein the first plurality of gate/source pins and the second plurality of gate/source pins pop out vertically from the first power module substrate and the second power module substrate respectively.

12. The multi-phase power inverter as recited in claim 10, wherein the positive DC power bus and the negative DC power bus are arranged at a first end of the X-type multilevel power converter, and wherein the first AC bus, the second AC bus, the third AC bus, and the fourth AC bus are arranged at a second end of the X-type multilevel power converter.

13. The multi-phase power inverter as recited in claim 8, wherein each of the plurality of semiconductor switches includes a plurality of dies.

14. The multi-phase power inverter as recited in claim 8, further including a cold plate arranged between the third tier and the fourth tier of the multi-phase inverter.

15. A multi-phase power inverter for an electric propulsion system, the multi-phase power inverter comprising:

a plurality of X-type multilevel power converters arranged to transfer electric power between a high-voltage direct current (DC) power supply and an electric machine, wherein each of the plurality of X-type multilevel power converters is a solid-state integrated circuit (IC) including:

a first positive DC power bus;

a second positive DC power bus;

a first negative DC power bus;

a second negative DC power bus;

a neutral bus;

a first alternating current (AC) bus;

a second AC bus;

a third AC bus;

a fourth AC bus;

a first conductive layer;

a second conductive layer;

a third conductive layer;

a fourth conductive layer;

a plurality of semiconductor switches including a first semiconductor switch, a second semiconductor switch, a third semiconductor switch, a fourth semiconductor switch, a fifth semiconductor switch, a sixth semiconductor switch, a seventh semiconductor switch, and an eighth semiconductor switch; and at least two first clamping diodes, and at least two second clamping diodes;

wherein the first semiconductor switch, the second semiconductor switch, the third semiconductor switch, and the fourth semiconductor switch are connected in series between the positive DC power bus and the negative DC power bus;

wherein the fifth semiconductor switch, the sixth semiconductor switch, the seventh semiconductor switch, and the eighth semiconductor switch are connected in series between the positive DC power bus and the negative DC power bus;

wherein the first semiconductor switch is connected to the second semiconductor switch at a first node, wherein the second semiconductor switch is connected to the third semiconductor switch at a second node, and wherein the third semiconductor switch is connected to the fourth semiconductor switch at a third node;

wherein the fifth semiconductor switch is connected to the sixth semiconductor switch at a fourth node, wherein the sixth semiconductor switch is connected to the seventh semiconductor switch at a fifth node, and wherein the seventh semiconductor switch is connected to the eighth semiconductor switch at a sixth node;

wherein the at least two first clamping diodes are connected between the third node and the fourth node;

wherein the at least two second clamping diodes are connected between the first node and the sixth node;

wherein the second node is connected to the first AC bus;

wherein the fifth node is connected to the second AC bus;

wherein the plurality of semiconductor switches, the positive DC power bus, the negative DC power bus, the first AC bus, the at least two first clamping diodes, and the at least two second clamping diodes are arranged into a plurality of tiers including:

a first tier composed of the fifth semiconductor switch arranged coplanar with the sixth semiconductor switch that is arranged coplanar with the seventh semiconductor switch that is arranged coplanar with the eighth semiconductor switch;

a second tier composed of the first positive DC power bus arranged coplanar the first negative DC power bus that is arranged coplanar with the first conductive layer that is arranged coplanar with second conductive layer that is coplanar with the first AC bus;

a third tier composed of the first clamping diode arranged coplanar with the second clamping diode;

a fourth tier composed of the second positive DC power bus arranged coplanar with the second negative DC power bus that is arranged coplanar with the third conductive layer that is arranged coplanar with the fourth conductive layer that is arranged coplanar with the second AC bus; and a fifth tier composed of the first semiconductor switch arranged coplanar with the second semiconductor switch that is arranged coplanar with the third semiconductor switch that is arranged coplanar with the fourth semiconductor switch.

16. The multi-phase power inverter as recited in claim 15, further including:

a first heat sink;

a second heat sink;

a first power module substrate; and a second power module substrate; and wherein the fifth semiconductor switch, the sixth semiconductor switch, the seventh semiconductor switch, and the eighth semiconductor switch are adjoined to a first side of the first power module substrate, and the first heat sink is adjoined to a second side of the first power module substrate; and wherein the first semiconductor switch, the second semiconductor switch, the third semiconductor switch, and the fourth semiconductor switch are adjoined to a first side of the second power module substrate, and the second heat sink is adjoined to the second side of the second power module substrate.

17. The multi-phase power inverter as recited in claim 16, wherein the fifth semiconductor switch, and the sixth semiconductor switch are arranged on a first portion of the first power module substrate;

wherein a first plurality of gate/source pins are arranged on a second portion of the first power module substrate;

wherein the seventh semiconductor switch, and the eighth semiconductor switch are arranged on a third portion of the first power module substrate;

wherein the first portion, the second portion, and the third portion of the first power module substrate are coplanar, the second portion being arranged between the first portion and the third portion;

wherein the first semiconductor switch, and the second semiconductor switch are arranged on a first portion of the second power module substrate;

wherein a second plurality of gate/source pins are arranged on a second portion of the second power module substrate;

wherein the third semiconductor switch and the fourth semiconductor switch are arranged on a third portion of the second power module substrate; and wherein the first portion, the second portion, and the third portion of the second power module substrate are coplanar, the second portion being arranged between the first portion and the third portion.

18. The multi-phase power inverter as recited in claim 17, wherein the first plurality of gate/source pins and the second plurality of gate/source pins pop out vertically from the first power module substrate and the second power module substrate respectively.

19. The multi-phase power inverter as recited in claim 18, wherein the positive DC power bus and the negative DC power bus are arranged at a first end of the X-type multilevel power converter, and wherein the first AC bus, the second AC bus, the third AC bus, and the fourth AC bus are arranged at a second end of the X-type multilevel power converter.

20. The multi-phase power inverter as recited in claim 15, wherein each of the plurality of semiconductor switches includes a plurality of dies.

* * * * *